(12) United States Patent
Buckley et al.

(10) Patent No.: US 12,505,243 B2
(45) Date of Patent: Dec. 23, 2025

(54) IMAGE AND MESSAGE MANAGEMENT AND ARCHIVING FOR EVENTS

(71) Applicant: Hooga Holdings Pty Limited, New South Wales (AU)

(72) Inventors: Belinda Buckley, Victoria (AU); Adam Pryor, New South Wales (AU); Toby Blyth, New South Wales (AU)

(73) Assignee: Hooga Holdings Pty Limited, New South Wales (AU)

( * ) Notice: Subject to any disclaimer, the term of this patent is extended or adjusted under 35 U.S.C. 154(b) by 193 days.

(21) Appl. No.: 18/534,431

(22) Filed: Dec. 8, 2023

(65) Prior Publication Data

US 2024/0354434 A1 Oct. 24, 2024

Related U.S. Application Data

(63) Continuation-in-part of application No. 17/983,937, filed on Nov. 9, 2022, now Pat. No. 12,008,128.
(Continued)

(30) Foreign Application Priority Data

Aug. 11, 2017 (AU) .............................. 2017903207

(51) Int. Cl.
*G06F 21/62* (2013.01)
*G06F 16/2457* (2019.01)
(Continued)

(52) U.S. Cl.
CPC .... *G06F 21/6218* (2013.01); *G06F 16/24575* (2019.01); *G06F 16/248* (2019.01); *G06V 40/16* (2022.01); *H04L 63/083* (2013.01); *H04L 63/0861* (2013.01); *H04L 63/102* (2013.01); *H04W 4/021* (2013.01)

(58) Field of Classification Search
CPC ........... G06F 21/6218; G06F 16/24575; G06F 16/248; G06V 40/16; H04L 63/083; H04L 63/0861; H04L 63/102; H04W 4/021
See application file for complete search history.

(56) References Cited

U.S. PATENT DOCUMENTS

| 2011/0064281 A1 | 3/2011 | Chan |
| 2014/0002663 A1 | 1/2014 | Garland |

(Continued)

FOREIGN PATENT DOCUMENTS

WO 2015/061696 A1 4/2015

OTHER PUBLICATIONS

International Search Report and Written Opinion as mailed on Nov. 16, 2018 for International Application No. PCT/AU2018/050854, 5 pages.
(Continued)

*Primary Examiner* — Quazi Farooqui
(74) *Attorney, Agent, or Firm* — Kilpatrick Townsend & Stockton LLP

(57) ABSTRACT

An image archiving facility creates an image and other data archive relating to an event at a location when prompted by a downloaded application for a host user. The host user may approve guest users to upload to the archive. Approval may come from an image of a person uploaded to the data archive and recognized from biometric data as an approved user. The host may control viewing of images in the archive either individually or generically.

16 Claims, 23 Drawing Sheets

Related U.S. Application Data which is a continuation of application No. 16/638,275, filed as application No. PCT/AU2018/050854 on Aug. 13, 2018, now Pat. No. 11,531,776.

(51) Int. Cl.
| | |
|---|---|
| *G06F 16/248* | (2019.01) |
| *G06V 40/16* | (2022.01) |
| *H04L 9/40* | (2022.01) |
| *H04W 4/021* | (2018.01) |

(56) References Cited

U.S. PATENT DOCUMENTS

| | | |
|---|---|---|
| 2014/0359482 A1 | 12/2014 | Sinn et al. |
| 2015/0019523 A1 | 1/2015 | Lior et al. |
| 2015/0350266 A1 | 12/2015 | O'Brien |
| 2016/0232402 A1 | 8/2016 | Jiang |
| 2017/0052650 A1 | 2/2017 | Koolwal et al. |
| 2017/0222962 A1 | 8/2017 | Gauglitz et al. |
| 2018/0137198 A1 | 5/2018 | Radichkov |

OTHER PUBLICATIONS

Extended European Search Report mailed on Feb. 16, 2021 for EP Application No. 18844865.8, 13 pages.
AU2018315634, "First Examination Report", Jun. 27, 2023, 3 pages.

IMAGE AND MESSAGE MANAGEMENT AND ARCHIVING FOR EVENTS

CROSS REFERENCE TO RELATED APPLICATIONS

This application is a Continuation in Part of U.S. patent application Ser. No. 17/983,937 filed on Nov. 9, 2022, which is a Continuation of U.S. patent application Ser. No. 16/638,275, filed Feb. 11, 2020, now U.S. Pat. No. 11,531,776, which is a US National Phase of PCT Application PCT/AU2018/050854, filed Aug. 13, 2018, which claims priority to Australian Application No. 2017903207 filed on Aug. 11, 2017, the contents of which are incorporated by reference in their entirety for all purposes.

TECHNICAL FIELD

The invention generally relates to management of event attendee multimedia and communication.

More particularly the invention relates to the management and archiving of images and messages relating to an event, where this can most desirably, but not exclusively, be performed in one embodiment by one person acting as a host and another person or persons acting as guests, all of whom are located primarily at the event and are identified as having permission to contribute to the archive.

BACKGROUND ART

Methods of archiving images, including classical storage of such images, are known, it is also known to place such images on an Internet site where they may be available to many persons through an application or where a viewer must provide security information in order to be able to view the images. Such internet access is provided by, for instance, Facebook™ and Instagram™ where images and messages may be lodged in various Facebook sites by persons who have permissions to do so.

However, whilst these Internet sites provide server-based repositories for access by multiple users via the Internet, still they provide for a poor user experience to access an event, where the images may be:
  scattered—being held across several devices and different social media platforms
  missing—not uploaded or have wrong tags due to the complexity associated with attending to this cluttered—are redundant or contain duplicates
  not curated—include undesirable images forever that are unable to be deleted.

Some attempts have been made at overcoming the short comings of these well-known social media sites by seeking to achieve image collection and dissemination on a single page. Examples of these types of websites using an App interface include Wedpics™ and Eversnap™.

However, both of the aforementioned websites are expensive to access, and require many steps to be undertaken by a user, some of which are confusing to the lay user, and thus promote more possibility for errors to occur before achieving the desired result.

These previous efforts to provide an event associated archiving facility for images have also tended to provide limited security in terms of copyright and user privilege and limited user interaction in terms of the ability to contact others at the same event venue or to have images or other items placed on a site associated with the event.

Therefore, a need exists to not only allow persons located at an event to be permitted to upload images and other information to an archiving repository, but to do so simply, making for an entire simple and powerful user experience.

Additionally, a need exists for a solution to the problem of providing adequate security for access to an archiving application while still allowing a rapid uptake of images and other information to a possibly short-term event.

Providing a solution to the aforementioned problems is not readily apparent in adopting conventional computer software design techniques that are commonly known. Indeed, a number of technical problems present themselves to a software engineer in devising a solution using commonly known software implementation techniques.

For example, the obvious way to proceed would be considering known social networking implementation techniques to provide a solution. However, social networks typically rely on manually creating and/or verifying connections between users. In the context of the present invention, this is cumbersome and blocks many interactions until the particular connection is made by the user.

Ideally, it is desirable to provide a system and methodology that allows for anyone to be able to create an event at a single-touch, minimising the parameters that need to be input and defined. Whilst this is a simple object to specify, it is exceedingly difficult to achieve technically.

Another ideal to achieve is for users to join such simply created events automatically and contribute images without requiring cumbersome permission steps to do so. Again, this is a relatively simple objective, but is exceedingly difficult to achieve technically.

A further source of complexity, perhaps not that well appreciated in view of the ubiquitous nature of standard interfaces, is the adoption of user logins and email addresses to access application programs and provide the communication of messages between users and posts. Several simplified user interfaces are available, however technically implementing these to achieve the desired objects of the invention again is not a matter of mere selection, but requires some technical considerations that are not immediately obvious to a skilled addressee of the invention in the art.

The present invention provides a solution to these and other problems which offers advantages over the prior art or which will at least provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in Australia or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

OBJECTS OF INVENTION

It would be desirable to overcome or ameliorate at least one of the disadvantages of the prior art, or to provide a useful alternative.

It would further be desirable to, in a preferred form, provide an apparatus or method used for archiving of images and communication of messages between users based on an image.

It has been recognised that the traditional event creation process has rigid constraints built around the requirement of direct connections (and thereby communication between users) being created and verified between users and images whereas one need only infer loose associations between images, users and an event.

It has also been recognised that another constraint is the manual creation of these connections by the user whereas the adoption of auto-permissions using co-attendance may be a way of achieving the requisite degree of association. Thus, removing the need to prepare guest connections/contact details and removing the invitation/permission step is seen as a way of achieving simplicity, without detracting from functionality, as well as presenting a degree of technical character to the problem to be overcome using a software solution.

Another area to achieve simplicity is with respect to the event creation process itself, where it is recognised that advantages can be achieved by making the event creation process simple enough to be performed by a user at the location where the event is to take place or is taking place and starting the event in real time. In this manner, automated multi-location, flexible-duration events can be achieved by removing the location step, the event boundary step, the start time step and the duration step.

Removing manual steps of location, boundary, start and duration permits richer models to be created for an event, providing more flexibility in allowing enhanced modelling, inferencing and automation when the event is represented this way.

This enhanced representation of a multilocation event can enable it to be adopted at multiple locations, allow the provision of richer location models such as probabilistic maps, machine learning/artificial intelligence inferences and automated event locations and start, end and completion times.

SUMMARY OF INVENTION

According to an aspect of the present invention, there is provided a method of regulating event attendance and initiation of communication between one or more users, the method including: a first host user creating at a remote service a repository relating to an event at a specified location; one or more guest users located at the event at the specified location and having been provided with permission to do so, asynchronously storing in the repository information relating to the event, the information including at least one image; and wherein the at least one image stored to the repository wherein the images stored to the repository are subjected to analysis by the remote service to determine whether persons appearing in the image are identifiable as persons known and approved by the first host user or a delegate; persons known and approved by the first host user or delegate and appearing in images to a guest user being linked in the image to an identifier, the identifier allowing initiation of communication from the guest user to the identified person in the image.

In one or more embodiments, the analysis by the remote service includes extracting a facial hash from an image for use as an identifier.

In one or more embodiments, initiation of communication includes interacting with the image or one or more faces within the image.

In one or more embodiments, interacting with the image includes tapping, double-tapping, clicking, press-and-hold or swiping on the image or the one or more faces within the image.

In one or more embodiments, the method further includes the step of displaying a contact card, the contact card containing biographical details associated with a user in the image, in response to interacting with the image or one or more faces within the image.

In one or more embodiments, the method further includes the step of providing a communication channel in response to interacting with the image or one or more faces within the image.

In one or more embodiments, the communication channel includes, one or more of a message application, video call or instant messaging service.

In one or more embodiments, the at least one image is an image of one or more users; and wherein persons determined to be known and approved by the first host user or a delegate and appearing in the image are linked in the image to an identifier, the identifier allowing initiation of communication from two or more users identified in the image.

In one or more embodiments, the image is captured by a mobile communication device associated with one or more of the users.

In one or more embodiments, an at least one image stored in the repository being optionally made available for download from the remote service to one or more persons upon the approval of the first host user or a delegate of the first host user.

In one or more embodiments, the one or more persons to whom the at least one image is optionally made available for download is a guest user.

In one or more embodiments, a guest user is provided with permission to asynchronously store information in the repository using the remote service by the host user or a delegate of the first host user.

In one or more embodiments, images stored in the repository are separately authorised by the first host user to be separately viewable by one or more guest users.

In one or more embodiments, images stored in the repository may be separately authorised by the first host user to be viewable by any user.

In one or more embodiments, the one or more guest users are granted permission by the providing of a passcode to the user by the first host user.

According to an aspect of the present invention, there is provided a system for regulating event attendance and initiation of communication between one or more users, the system including: an application for download to a device from a remote source; a first host user mobile device after downloading and installing the application thereto having a repository creator process to create at a remote service a repository relating to an event at a specified location or at the location of the first host user; one or more guest user mobile devices capable of being located at the event location, the one or more guest user mobile devices after downloading and installing the application thereto to asynchronously store information relating to the event and including images to the repository relating to the event after being identified and being granted permission to do so; the information including at least one image; and wherein the at least one image stored to the repository are subjected to analysis by the remote service to determine whether persons appearing in the image are identifiable as persons known and approved by the first host user or a delegate; the stored information in the repository being wholly or separately authorised by said first host user mobile device to be available for viewing by at least selected guest user mobile devices; and persons known and approved by the first host user or delegate and appearing in images to a guest user being linked in the image to an identifier, the identifier allowing initiation of communication from the guest user to the identified person in the image.

In an embodiment, there may be provided, a method of regulating event attendance and initiation of communication between one or more users, or a method of creating an event gallery archive, the method including the steps of:

a) providing a first user interface for a first user device;
b) receiving an event reference for a new event;
c) automatically obtaining a current first user device location; and
d) sending data indicative of the event reference and current first user device location to a remote servicer device for instantiating (or creating/initiating) an event entry in a remote event database.

Preferably, the event reference is an event name entered by a user via the user interface. However, it will be appreciated that the event name may be derived by parsing a relevant textual sentence on an event invite, an event ticket, or from an event database (e.g., by way of a natural language parsing system, location analysis, or the like).

Preferably, the event entry further includes an event boundary determined by the server device. More preferably, the event entry includes a plurality of event boundaries determined by the server device.

Preferably, the event entry further includes an event start time entered by a user via the first user interface.

Preferably, the server device automatically determines an event end time for the event.

In an embodiment, there may be provided a method of regulating event attendance and initiation of communication between one or more users, or accessing an event gallery archive instantiated (or created/initiated) by any one of the preceding claims, the method including the steps of:

providing a second user interface for a second user device;
automatically obtaining a current second user device location;
sending data indicative of the current second user device location to a remote servicer device; and
a remote server searching the event database to identify a list of relevant events based on the current second user device location and current time.

Preferably, the server device automatically selects a most relevant event.

In an embodiment, there may be provided a method of regulating event attendance and initiation of communication between one or more users, or a method of accessing an instantiated (or created/initiated) event gallery archive, the method including the steps of:

a) providing a third user interface for a third user device;
b) viewing, on the third user device, an image uploaded to the event gallery archive, the uploaded image having been parsed by the remote server device to isolate one or more portions of the image relating to individual persons;
c) selecting one of the portions of the image relating to an individual person;
d) providing a message for the individual person; and
e) sending data indicative of the message to a remote servicer device, the remote server device linking the message to the individual person.

Preferably, the server device automatically generates facial recognition parameters for the selected individual person; the server device automatically links the selected individual person to a fourth user account, the remote server device forwards the message to a device associated with the fourth user account.

In an embodiment, there may be provided a method of regulating event attendance and initiation of communication between one or more users, or a method of regulating image archiving by:

a first host user creating at a remote service a repository relating to an event at a specified location;
one or more guest users located at the event at the specified location and having been provided with permission to do so asynchronously storing in the repository information relating to the event, the information including at least one image;
an at least one image stored in the repository being optionally made available for download from the remote service to one or more persons upon the approval of the first host user or a delegate of the first host user.

Preferably the one or more persons to whom the at least one image is optionally made available for download is a guest user.

Preferably a guest user is provided with permission to asynchronously store information in the repository using the remote service by the host user or a delegate of the first host user.

Preferably the images stored to the repository are subjected to analysis by the remote service to determine whether persons appearing in the image are identifiable as persons known and approved by the first host user or delegate; persons known and approved by the first host user or delegate and appearing in images to a guest user being linked in the image to an identifier, the identifier allowing initiation of communication from the guest user to the identified person in the image.

In an embodiment, there may be provided a method of regulating event attendance and initiation of communication between one or more users, or a method of approving guest users for participation in uploading information from an event to an event repository at a remote service including:

creating event occurrence information at a remote service the occurrence information relating to an event occurring at a datetime and/or at a location,
viewing a selfie of a person at the event;
approving the person to upload information to the event by adding an identification of the person as a guest user in the event occurrence information at the remote service.

In an embodiment, there may be provided a method of regulating event attendance and initiation of communication between one or more users, or a method of approving guest users for participation in uploading information from an event to an event repository at a remote service and downloading information from the event repository including:

creating event occurrence information at a remote service the occurrence information relating to an event occurring at a datetime and/or at a location, uploading to the remote service from the event an image of at least one attendee of the event;

identifying in the uploaded image from biometric features persons known to the event creator;

adding an identification of the persons known to the event creator as guest users in the event occurrence information at the remote service and advising the identified persons of their approval to upload information to the event repository.

In an embodiment, there may be provided a method of regulating event attendance and initiation of communication between one or more users, or a service for archiving information from an event at an event location, the archived information including images provided by persons at the event and the service including:

an event creation service creating an event repository for an event at a location when remotely requested by a host;

the host setting approval parameters for persons wishing to upload information including images to the event repository;

the host setting parameters for the availability for download of individual images uploaded to the event repository by an approved person;

a guest approval service allowing uploads to the event repository from a guest located at the event location, the guest approval service approving a guest meeting the parameters set by the host;

a download service making individual images available for download to approved persons in accordance with the download parameters.

Preferably the service is accessed from a mobile device.

Preferably the guest approval parameters require that the host approve an image of a proposed guest.

Preferably the guest approval parameters allow the service to approve an image of a guest in an image uploaded from the event where the image biometrics match those of a guest previously approved by the host.

In an embodiment, there may be provided a method of regulating event attendance and initiation of communication between one or more users, or a method of regulating image archiving wherein:

an application is provided for download thereof from a remote source;

a first host user after downloading and installing the application to a mobile device creating at a remote service a repository relating to an event at a specified location or at the current first host user location;

one or more guest users located at the event location, the one or more guest users after downloading and installing the application to a mobile device being identified and being granted permission to asynchronously store information relating to the event and including images to the repository relating to the event;

the stored information in the repository being wholly or separately authorised by said first host user to be available for viewing by at least selected guest users.

Preferably images in the stored information in the repository may be separately authorised by the first host user to be separately viewable by one or more guest users.

Preferably images in the stored information in the repository may be separately authorised by the first host user to be viewable by any user.

Preferably the one or more guest users are granted permission by the providing of a passcode to the user by the first host user.

Preferably one or more guest users are granted permission by the first host user approval of a selfie received from the one or more guest host users.

Preferably the images stored to the repository are subjected to analysis by the remote service to determine whether persons appearing in the image are identifiable as persons known and approved by the host user; persons known and approved by the first host user and appearing in images being linked in the image appearing to a user in the mobile device application to an identifier, the identifier allowing communication from the user device application to a device application of the identified person in the image.

In an embodiment, there may be provided a system for regulating event attendance and initiation of communication between one or more users, or a system for hosting a service for archiving information from an event at an event location, the archived information including images provided by persons at the event and the service including:

an event creation service creating an event repository for an event at a location when remotely requested by a host;

the host setting approval parameters for persons wishing to upload information including images to the event repository;

the host setting parameters for the availability for download of individual images uploaded to the event repository by an approved person;

a guest approval service allowing uploads to the event repository from a guest located at the event location, the guest approval service approving a guest meeting the parameters set by the host; and a download service making individual images available for download to approved persons in accordance with the download parameters.

In an embodiment, there may be provided a system for regulating event attendance and initiation of communication between one or more users, or a system for creating an event gallery archive, the system including:

an interface process to provide a first user interface for a first user device; an event reference process to receive an event reference for a new event;

a location process to automatically obtain a current first user device location; and a transmission process to send data indicative of the event reference and current first user device location to a remote servicer device for creating an event entry in a remote event database.

In an embodiment, there may be provided a system for regulating event attendance and initiation of communication between one or more users, or a system for accessing an event gallery archive created by any one of the preceding claims, the system including:

an interface process to provide a second user interface for a second user device;

a location process to automatically obtain a current second user device location; and a remote server to search the event database to identify a list of relevant events based on the current second user device location and current time.

According to another aspect of the invention, there is provided a system for regulating image archiving including:

a first host user device including a repository relating to an event at a specified location;

one or more guest user devices that can be located at the event at the specified location to asynchronously store in the repository information relating to the event, the information including at least one image on receiving permission to do so.

In an embodiment, there may be provided a system for regulating event attendance and initiation of communication between one or more users, or a system for approving guest users for participation in uploading information from an event to an event repository at a remote service including:

an event occurrence process to create event occurrence information at a remote service the occurrence information relating to an event occurring at a datetime and/or at a location; and an approval process allowing uploading of information to the event from a user device of a guest user after approving the guest user by adding an identification of the guest user in the event occurrence information at the remote service.

In an embodiment, there may be provided a system for regulating event attendance and initiation of communication between one or more users, or a system for approving guest users for participation in uploading information from an event to an event repository at a remote service and downloading information from the event repository including:

an event occurrence process to create event occurrence information at a remote service the occurrence information relating to an event occurring at a datetime and/or at a location;

an uploading process to upload to the remote service from the event an image of at least one attendee of the event;

an identifying process to identify in the uploaded image from biometric features persons known to the event creator; and an adding and approval process to add an identification of the persons known to the event creator as guest users in the event occurrence information at the remote service and advising the identified persons of their approval to upload information to the event repository.

In an embodiment, there may be provided a system for regulating event attendance and initiation of communication between one or more users, or According to still a further aspect of the invention, there is provided a system for regulating image archiving including:

an application for download to a device from a remote source;

a first host user mobile device after downloading and installing the application thereto having a repository creator process to create at a remote service a repository relating to an event at a specified location or at the location of the first host user;

one or more guest user mobile devices capable of being located at the event location, the one or more guest user mobile devices after downloading and installing the application thereto to asynchronously store information relating to the event and including images to the repository relating to the event after being identified and being granted permission to do so;

the stored information in the repository being wholly or separately authorised by said first host user mobile device to be available for viewing by at least selected guest user mobile devices.

These and other features of as well as advantages which characterise the present invention will be apparent upon reading of the following detailed description and review of the associated drawings.

Throughout the specification, unless the context requires otherwise, the word "comprise" or variations such as "comprises" or "comprising", will be understood to imply the inclusion of a stated integer or group of integers but not the exclusion of any other integer or group of integers.

BRIEF DESCRIPTION OF DRAWINGS

The best mode for carrying the invention is subsequently described by way of example to a specific and preferred embodiment of the invention with reference to the accompanying drawings in which.

BEST MODE(S) FOR CARRYING OUT THE INVENTION

The specific embodiment being an example of the best mode for carrying out the invention is directed towards a system and method for managing and archiving images and messages associated with a specific event using mobile devices operated by a number of people being users and a server to provide the archive and manage communications in a distributed way amongst the mobile devices. The system includes a mobile device operated by a person acting as a host of the event, and other mobile devices of persons acting as guests of the event.

Figure 1:
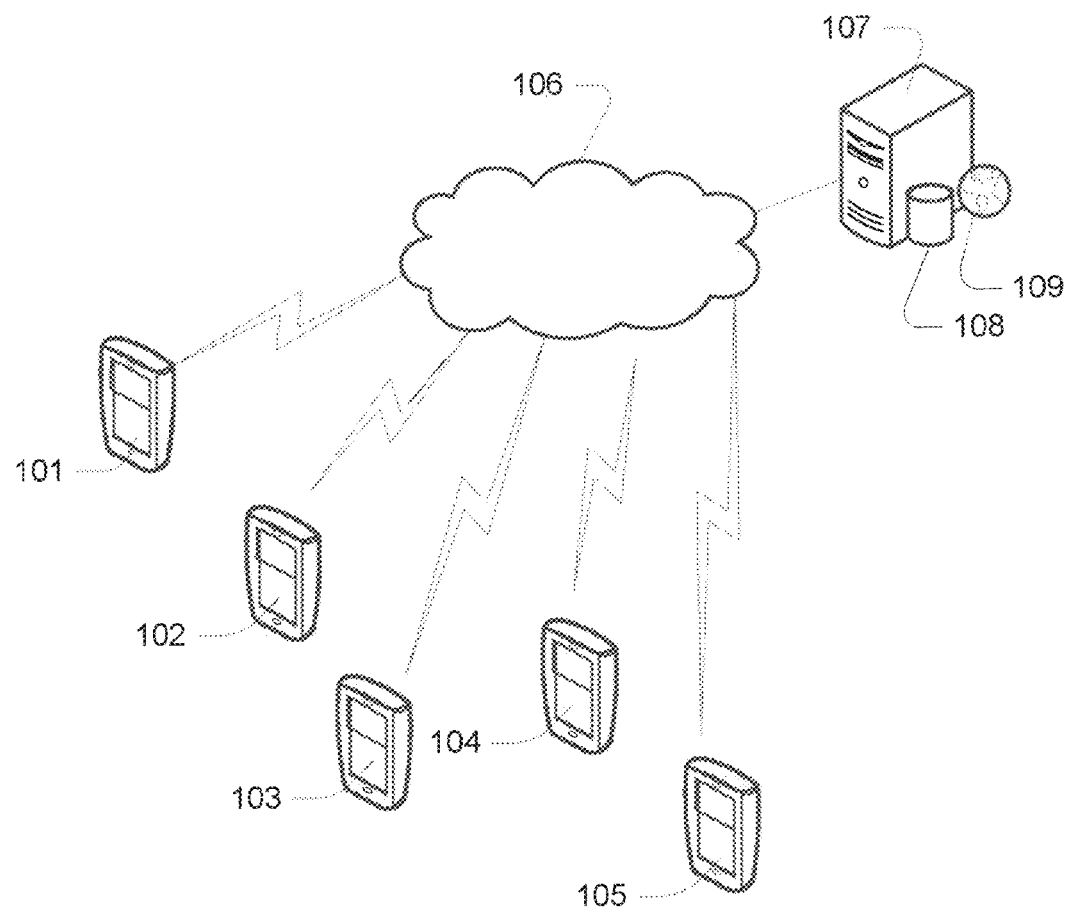
FIG. 1 is a view of the environment for capturing event images and other information.

Referring now to FIG. 1 the drawing shows a mobile device 101 operated by a person acting as the host of an event and other surrounding mobile devices 102 to 105 all located in the general vicinity of the location of an event and respectively operated by persons acting as guests of the event. Typically the event is a wedding, a sporting event, a concert, a celebrity appearance or similar gathering of a number of people having mobile devices in the form of mobile (smart) phones and located within a limited physical area.

One of the mobile phones of the person acting as the host, being the smart device 101, possibly prior to the event, attaches via a data connection typically through the internet 106 to an application server and data storage server operating together as a server 107 while running an application which can assist in creating a designated event 'hotspot' at the event location for the period of the event. Server 107 acts to run services which can create the data to support events, manage the storage to store information being uploaded by users and identify and provide permissions for users and viewers.

Figure 2:
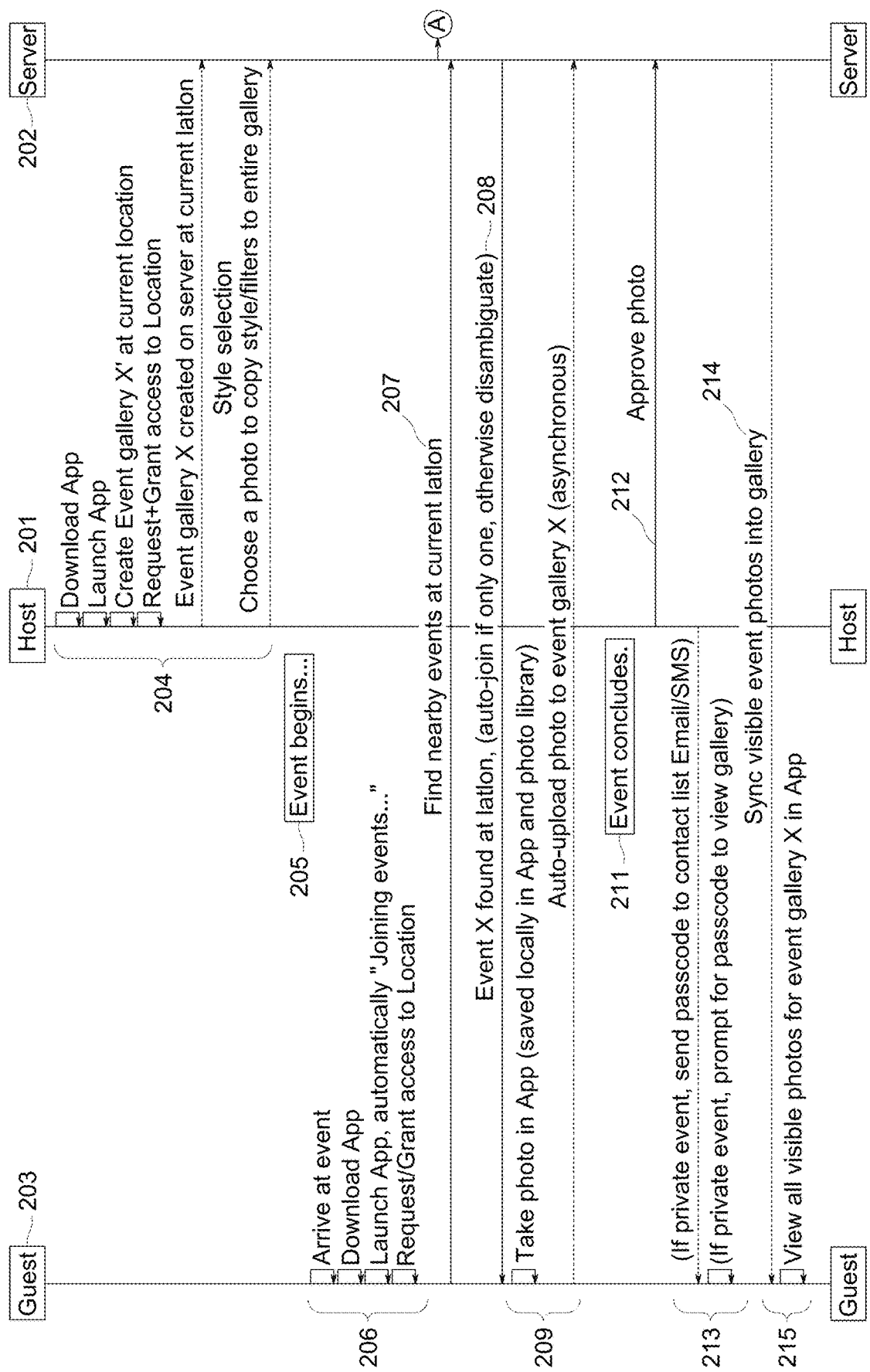
FIG. 2 is a timing diagram of the user experience during event attendance.
Figure 2:
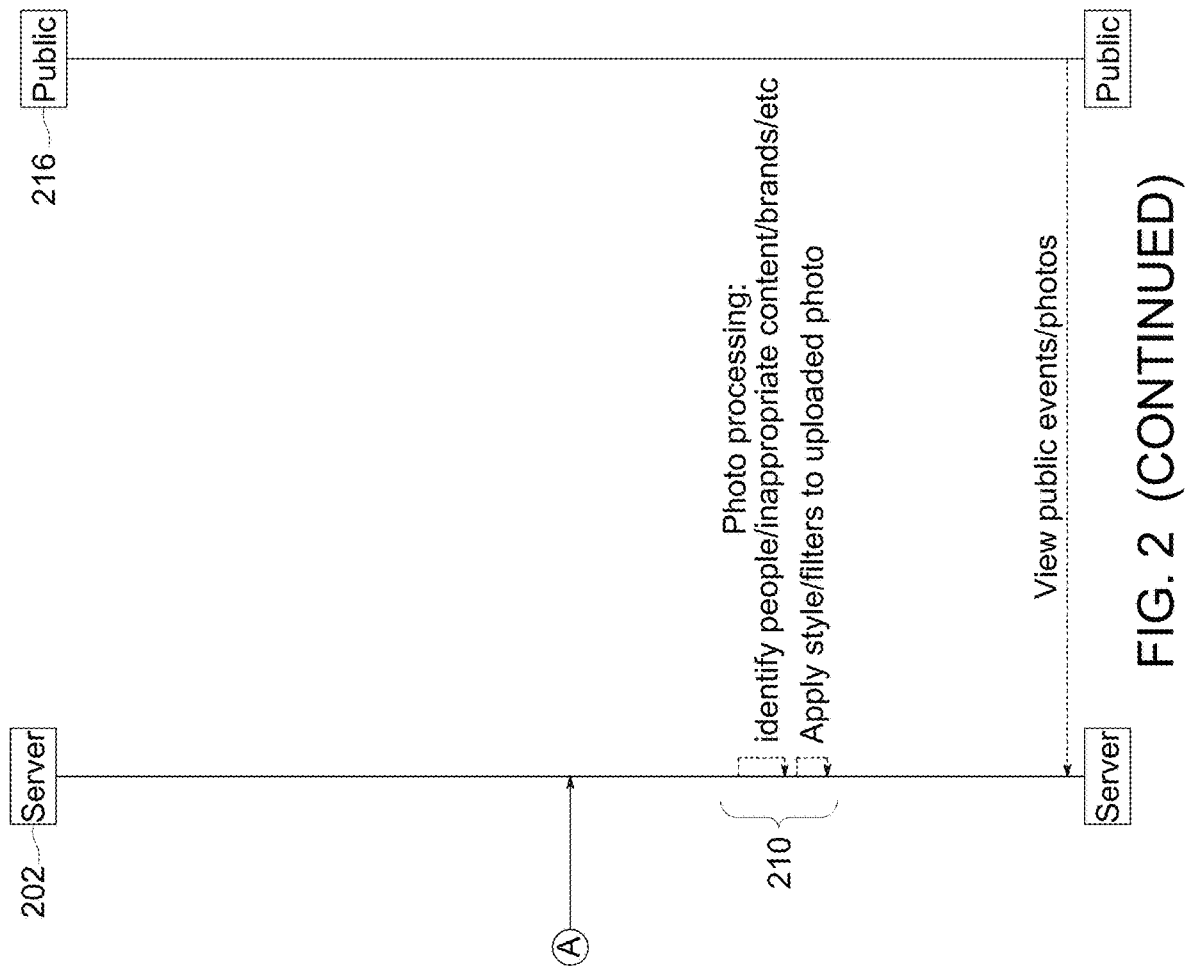

FIG. 2 shows how with the aid of the application a mobile device user as either host or guest at the 'event' can interact with a server at 202 storing data relating to the event. At 201 the mobile device user who will host the event at 204 downloads the app (or application) from an app source, launches it and creates an event gallery 'X' with a specified location at the current location of the mobile device or at a location chosen for a future event. Where the event is at the current location this necessarily requires that the host grant to the app access to the mobile devices location. In either case the app then communicates with server 107 and stores the details of the event including the location. These details include any photos later uploaded asynchronously through the application from user devices and any chat messages or other communications sent from within the application to another downloader of the application located at the event location.

The host may designate the security level of the event as either public, unlisted or secure, the difference being that for a secure event only guests who have received a passcode or who have been identified by the host from a selfie or the equivalent, may access the event. For unlisted events a guest must be at the event location to join it while for a public event anyone being at the event location can join. Access to the images uploaded by approved guests is managed such that the images viewed may be limited by user, by user type or by some other permission criteria. For instance, a user who uploaded images may allow only certain images to be viewed, or the host who created the event may allow only images from some users to be viewed other users during the event and after, or allow all images to be viewed by the general public once the event is ended. In an embodiment, an opt-in or opt-out toggle may be provided to globally disable all communications from all users. In an embodiment, communication preferences may be configurable on a per event basis. Typically, the images may be curated by the host at the end of the event and those approved may be released to be viewed be the public.

Once the event exists the host may then choose options for the styling of images uploaded to the event gallery, typically choosing from a number of predefined styles or by uploading a photograph image to act as a template.

When the event is created and set up on server 202 the potential storage of information relating to it is begun at 205.

Typically, a guest 203 may arrive at the event location at 206 and, if they do not already have the app, may download the event app. At launch the app will automatically locate at 207 any events close to the geographic location of the guest. The guest will select at 208 the chosen event or if it is the only one available it may be automatically selected.

Depending on the security level of the event identification of the guest must then take place before input from the guest can be accepted. Typically for a secure event the guest may supply a name and their photo, either as a selfie or from their device stored images. The identification level required will vary with the security level of the event. For example, a private event may be created such that a password is required to be entered before a user can join, view or contribute to the event. In a further embodiment, a "curated" (unpublished) event may be provided that cannot be viewed by other users but can be joined and contributed to. In both of these security examples, the security settings prevent communication or display of a contact card from happening unless permission is granted to the user.

Once the guest is identified as being at the event location they may take photos for asynchronous transfer to the remote server and identification of persons within them before sharing the linkages of the photos to viewers of the gallery.

Images uploaded to the server may, depending on the security level of the event, be made available for viewing by all immediately, may be held pending individual approval by the host or an approved delegate and then made available only to guests, or may be made available publicly after the event, or may be made available only to guests at the event during and after the event or some combination of these options.

Each guest may subsequently at 209 take one or more photos which will be uploaded to the server 202. The photos at 210 will be processed in server 202 to determine the identity of people appearing in the photos, whether or not the photo contains inappropriate content, and then the chosen styling will be applied to the photos, and they may at this stage, be viewable by the guests or by the public depending on the permissions which have been provided to the users and the images by the host.

When the event ceases as at 211, or before if wished, the host may approve each of the gallery photos for release at 212 or leave one or more unapproved and hence unviewable. The host may also approve one, more or all images for viewing, either through the app or via an associated website before the event ends.

Once a secure event gallery is released the host may send a passcode at 213 to those persons who are approved by the host for viewing, preferably from within the app or by SMS or email. The entry of this passcode into the app will allow them to view the gallery photos by synchronising the visible photos into the app at 216 for viewing or making them available to an associated website.

Where a public event gallery is released the event gallery is simply laid open to the public, namely anyone who has the app or wishes to view a website associated with the event.

Figure 3:
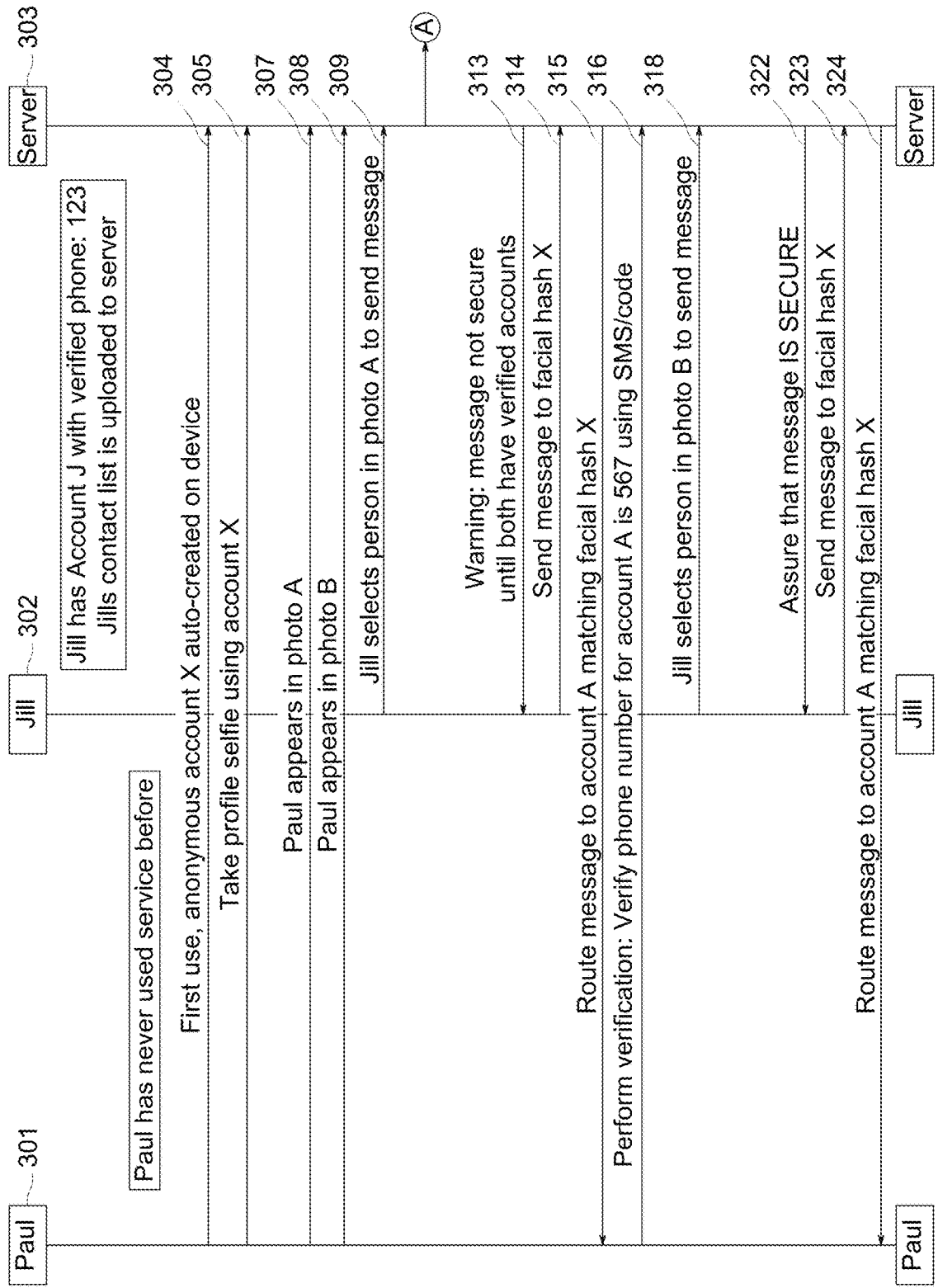
FIG. 3 is a process flowchart showing the approval process of a guest user.
Figure 3:
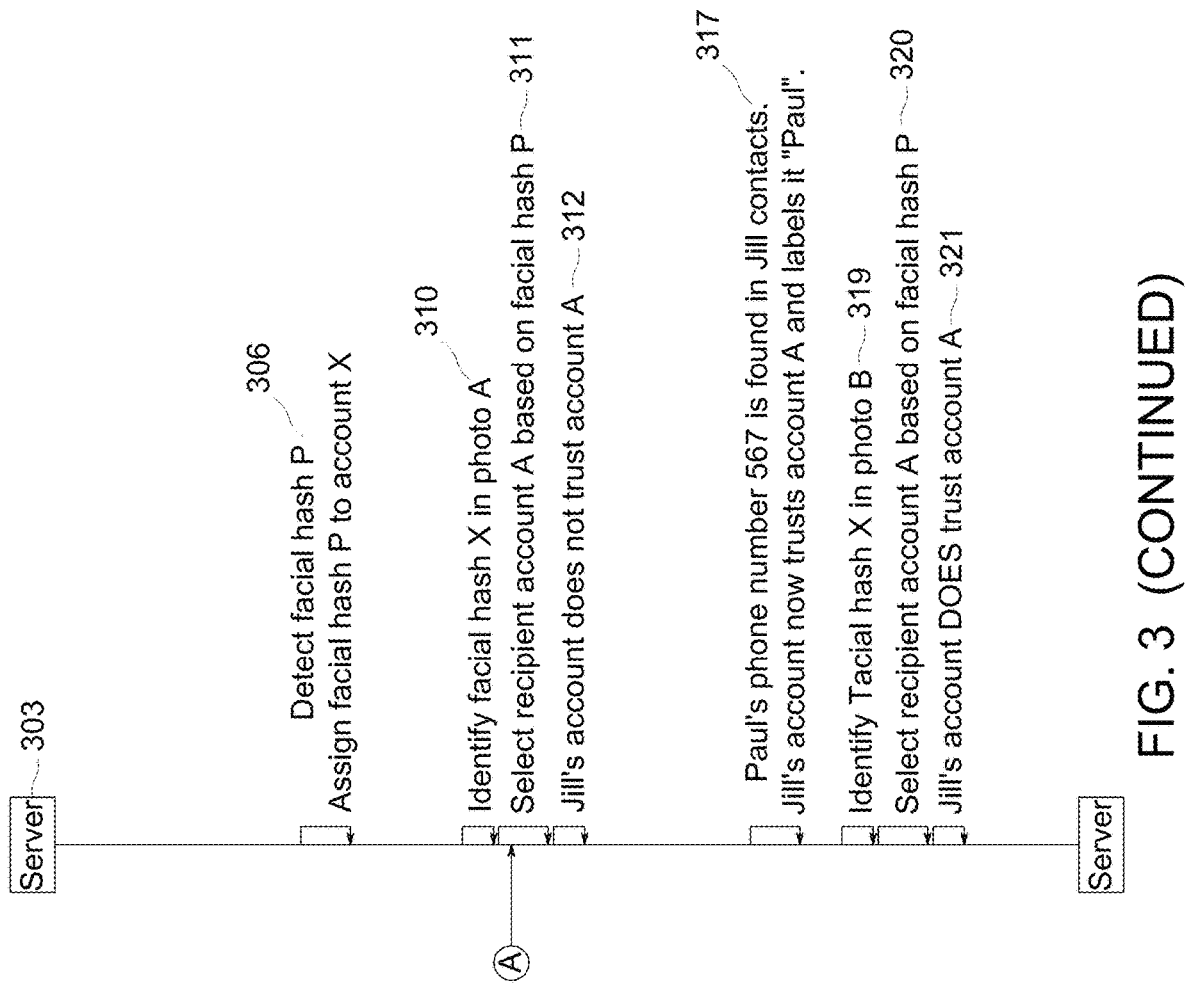

FIG. 3 shows the process by which a guest user is verified as an identifiable person. It shows a user 301 (Paul) who is unidentified, a user 302 (Jill) who is an identified person with identity information stored on server 303. The information typically stored is a biometric based facial hash extracted from a known image of Jill and a contact, typically a mobile phone number, associated only with that user. The server will normally have the users contacts uploaded by the downloaded application. As will be appreciated by those skilled in the art, a facial hash is a unique mathematical representation of a person's facial features. A facial hash is often derived from the analysis of key facial landmarks, such as the distance between the eyes, the shape of the nose, and the contours of the face. This facial hash may serve as a secure and compact representation of a person's facial biometrics, allowing for efficient storage and comparison. This is often referred to as a "faceprint".

At 304 Paul downloads the application, thus creating an initial anonymous account at the server. The application prompts the user to provide a selfie, as at 305, and when this is done the server extracts a facial hash from the image at 306 for use as an identifier. When Paul uploads his face to his profile, this gives the application the required information to match the users profile image to images uploaded to the platform. As soon as this has taken place communication with that user is possible and/or to view a contact card.

Subsequently user Jill uploads an image A in which Paul appears and he is identified at 307 in the image from the stored facial hash. A similar image B also uploaded also results in Paul being identified in the image at 308.

Jill wishes to message Paul, and therefore clicks on that face in her version of an uploaded image in the application in which Paul appears and begins to compose a message at 309. In an embodiment, instead of pressing a chat icon button directly on the user's face, a contact card may be shown. From the user's contact card a user can then initiate a communication. Advantageously, this offers contextual profile information before a user elects to initiate communication. The service at the server identifies the facial hash concerned at 310 and notes that the destination is not a verified account, and advises Jill of this at 313 but at 314 the message is sent to the server and issued to Paul. The service also retrieves from Pauls application his phone number. This is returned at 316 by the application.

The server now searches at 317 for that phone number and finds it in Jill's contact list. Paul is now considered to be trusted by Jill and is marked as such in her stored server information. In an embodiment, 313 to 317 may be omitted in that user who has completed a "sign-up" can communicate to any other signed up user by finding their face in any public or private event they can access. In this embodiment, there is no process for approval, however, a user may report or block another user who has been in contact if that user does not consent to the communication. In an embodiment, initiation of communication with another user via a contact card may, for example occur in two ways: 1. chat—The user can send a direct message, 2. meet—where the user can nominate a time to meet. Neither of these communication methods require consent before being used although in an embodiment, the consent arrangement may be adapted to match 313 to 317.

Subsequently at 318 Jill selects Paul in a second photograph to send a message to. As will be described further with reference to FIGS. 14 to 20, a contact card may be provided as an interface to connect with the individual in the photograph. The facial hash of the person selected is found in the server at 319 and Paul's account is selected at 320. It is verified at the server at 321 that Jill's account does trust Paul's, a message issues at 322 to Jill advising that Paul is trusted and her message issues to the server at 322 and is routed to Paul at 324.

Figure 4:
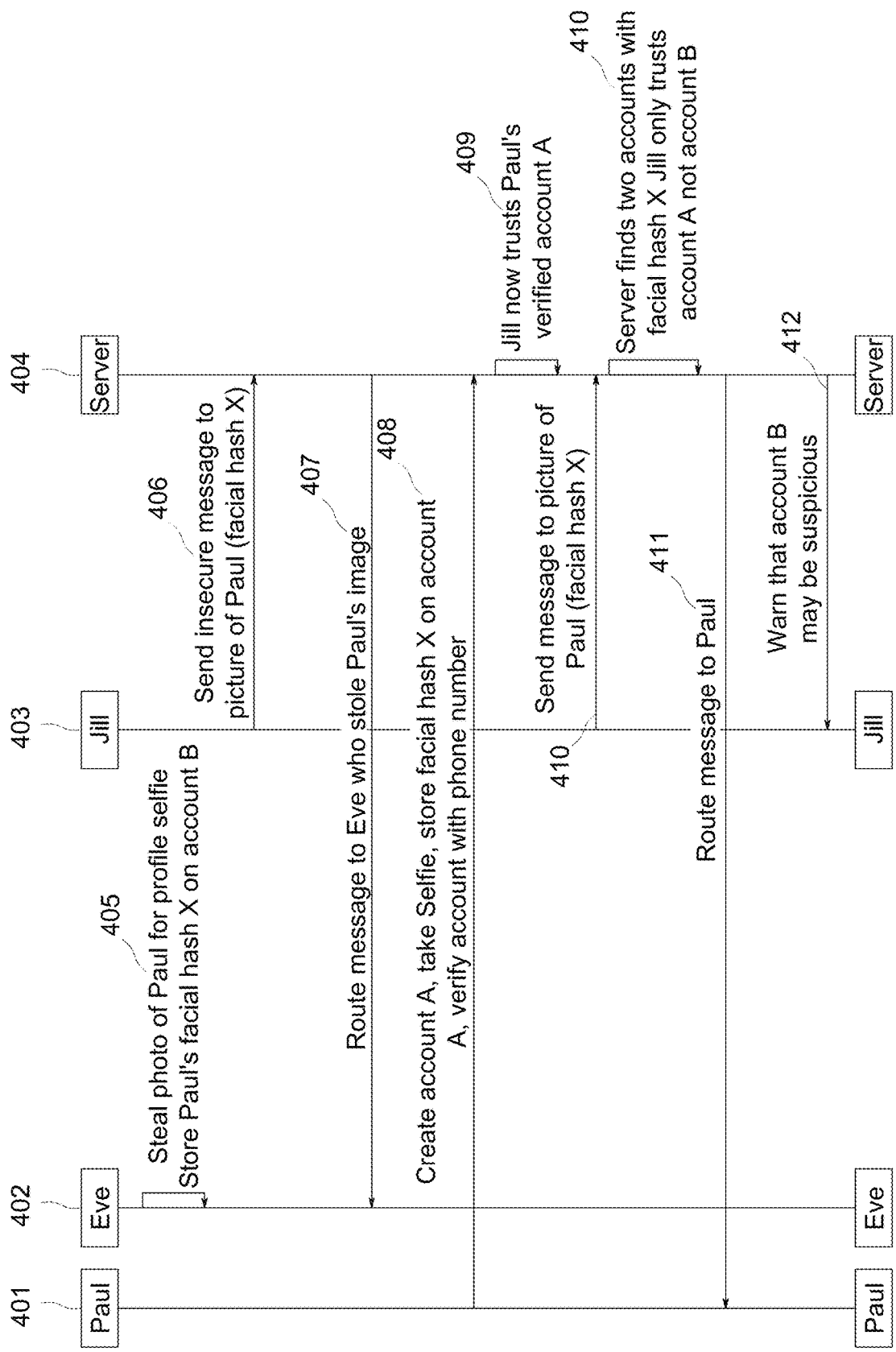
FIG. 4 is a process flowchart showing the approval process where an attempt at identity theft exists.

FIG. 4 depicts the attempted verification of a falsified image where an unknown user 401 (Paul), a verified user 402 (Jill), the remote server 403 and an impersonating user 404 (Eve) are shown. At 404 Eve has created an anonymous account on the server and then used an acquired image of Paul to verify it with her phone number. Jill at 405 then sends a message to an image of Paul appearing in an uploaded image of her own. At 406 the server routes this message to Eve, but as an insecure message because Jill's contacts do not include that phone number for that facial hash.

Subsequently Paul creates his own account with his own selfie, verifying it with his own phone number. There are now two accounts at the server with the same (or very similar) facial hashes and the server matches Pauls phone number with Jill's contact list and verifies the facial hash from the selfie he took for Jill to create a trust between Paul and Jill. Jill sends another message to Paul at 409 and the server checks the trust relationships for that facial hash at 410 and finds only one which Jill trusts. The message is issued at 411 to Paul and the server issues another to Jill advising her application that the unverified account for Paul's facial hash is suspicious.

One of the requirements for loading photos or other information to the event storage server is that the person wishing to upload the information has received upload permission. Depending on gallery configuration this may be granted automatically or may be gained by proof of identity or entering a passcode. Since both host and the potential guest contributor are at the same event it is possible for face to face recognition to take place and some confirming passcode to be parsed. Additionally it is possible for the server to already have a contact list of people who are approved by the host, and to automatically pass an approval from the app to this person on receipt of a query from that person through the app.

Furthermore a photo taken by the app at the event and uploaded to the server can be parsed by the event server to identify each person in the photo against facial hashes based on biometric features stored in a general storage area of the event server. When any photo is passed to the app the face will be linked to an identifier allowing the person to be identified and messaged from within the app. Where a person approved by the host is found in such a photo they will be approved as a guest for the event and a message sent notifying them of the approval.

When a person is viewing photos of the event they may click on an identified person in a photo and send them a message from within the app as will be described further with reference to FIGS. 14 to 20.

For a more rapid uptake in a shorter event each guest who has been approved by the host, whether by direct approval by the host or approval from a facial hash may also have the capability of approving persons as guests at the event.

The host of the event may review the photos after the event and approve only those which meet the hosts criteria. The remainder may be removed or may remain as unviewable by others.

Creating an Event

Figure 5:
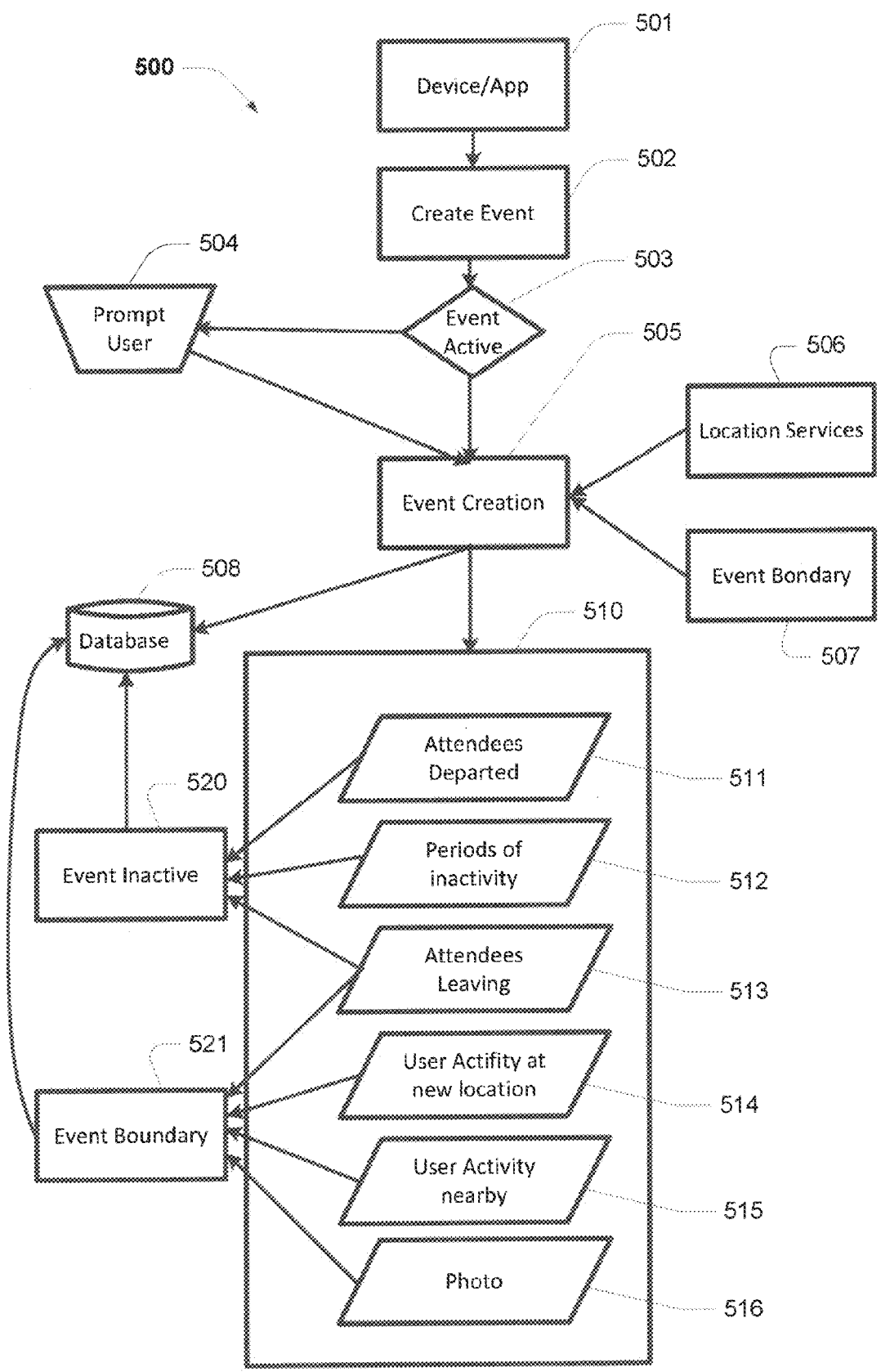
FIG. 5 is a process flowchart showing a method of creating and maintaining an event entry.

According to an aspect of the technology, by way of example only, FIG. 5 shows a flowchart for a method of creating an event 500. The event creation method 500 can include one or more of the following steps:

Step 501: providing a device or application coupleable to a data network for communicating to a server device—proceeding to step 502.

Step 502: receiving user input to create an event—proceeding to step 503.

Step 503: determining if the event has already been created—if yes, proceeding to step 504—if no, proceeding to step 505.

Step 504: prompting the user to select either: "join existing event" or "continue event creation"—if continuing event creation, proceed to step 505.

Step 505: creating a new event, receiving location information from the device or user (at 506), and receiving boundary information (at 507); upon creation of a new event, and event database (at 508) is updated to include the new event entry—proceeding to step 510.

Step 510: refining event entry.

Regarding step 502, user input can comprise selection of a "create event" button without requiring additional parameters being provided. Optional user provided parameters may include a passphrase for attendees gaining access to the event repository, an event location when not specifying the current location of the device, an event start time when not already commenced, additional options such as preventing new persons from joining an event unless existing "friends" are attendees.

Regarding step 505, location information may be in the form of GPS or others self-location within the device. The initial event boundary may be set to a particular radius about the event location, or a predefined boundary polygon retrieved from a database for the event location or based on a floorplan of the event venue. The event boundary can be adjusted or updated, for example over the duration of the event. An event can include a plurality of associated event boundaries. In an embodiment, events may be created according to tiers, where at a lower tier, which may be considered a "standard" event, there are limited features of availability to communicate or access contact cards, whereas at a higher tier, which may be considered to be a "premium" or "business" event, contact cards are displayed and associated with photos of individuals at the event which may also prompt users to create and complete information associated with their contact card when they arrive at the event—for improved networking at the event.

Regarding step 510, the event entry can be refined over time through monitoring of attendee numbers, location and activity. It will be appreciated that an event boundary (or entire event) may be identified as inactive (at 520) based on data that: attendees are identified as having departed a location separately (at 511) or together (at 513); and/or there are identified periods of inactivity (at 512). It will be further appreciated that an event boundary may be expanded or newly created (at 521) based on data that: it is identified that attendees have left a location together to a new location (at 513); there is significant user activity identified at a new location (at 514); there is user activity identified near and event location but outside a current boundary (at 515); and/or new photos are uploaded for an event (at 516).

Different event boundaries for identifying attendance at an event may be used either separately or together. For example, a more limited boundary defined for the event may be used to automatically identify an attendee as being at an event, whereas a larger boundary (increase radius) may be used to identify a new attendee where a registered friend has already been identified as attending.

Joining an Event

Figure 6A:
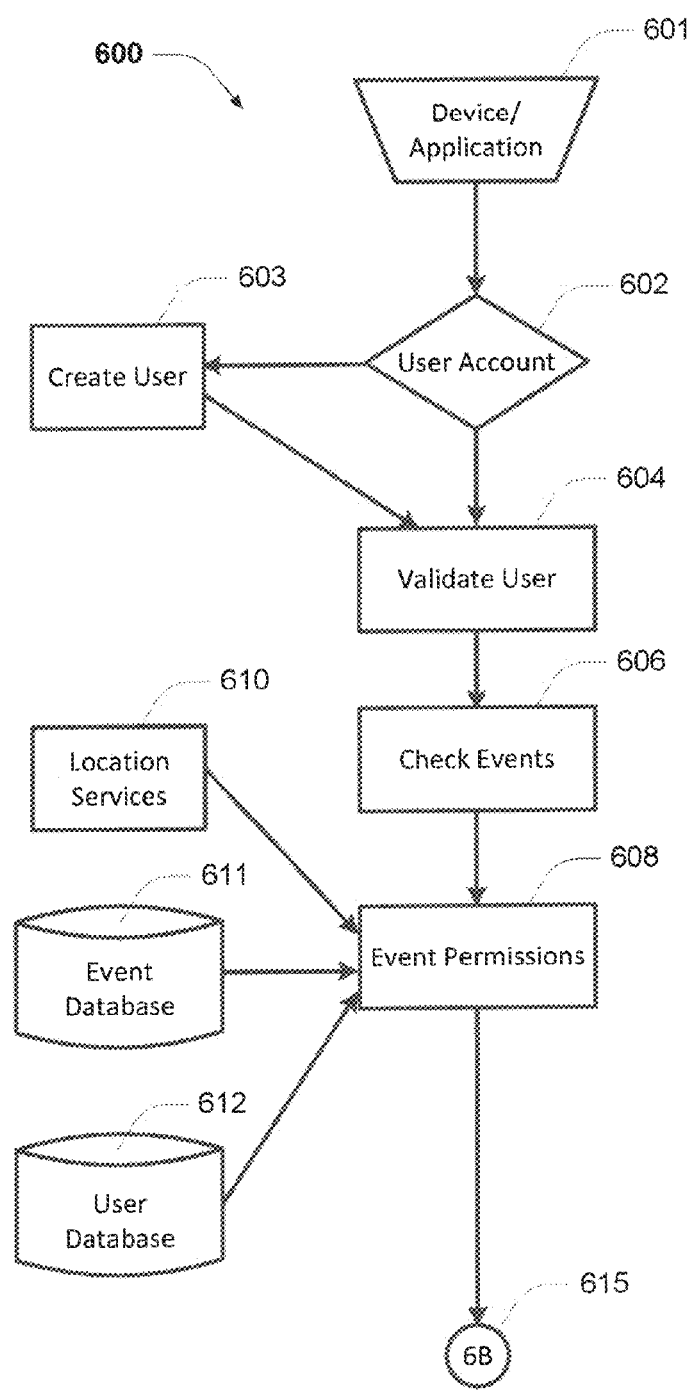
FIG. 6A is a process flowchart showing a method of joining an event.
Figure 6B:
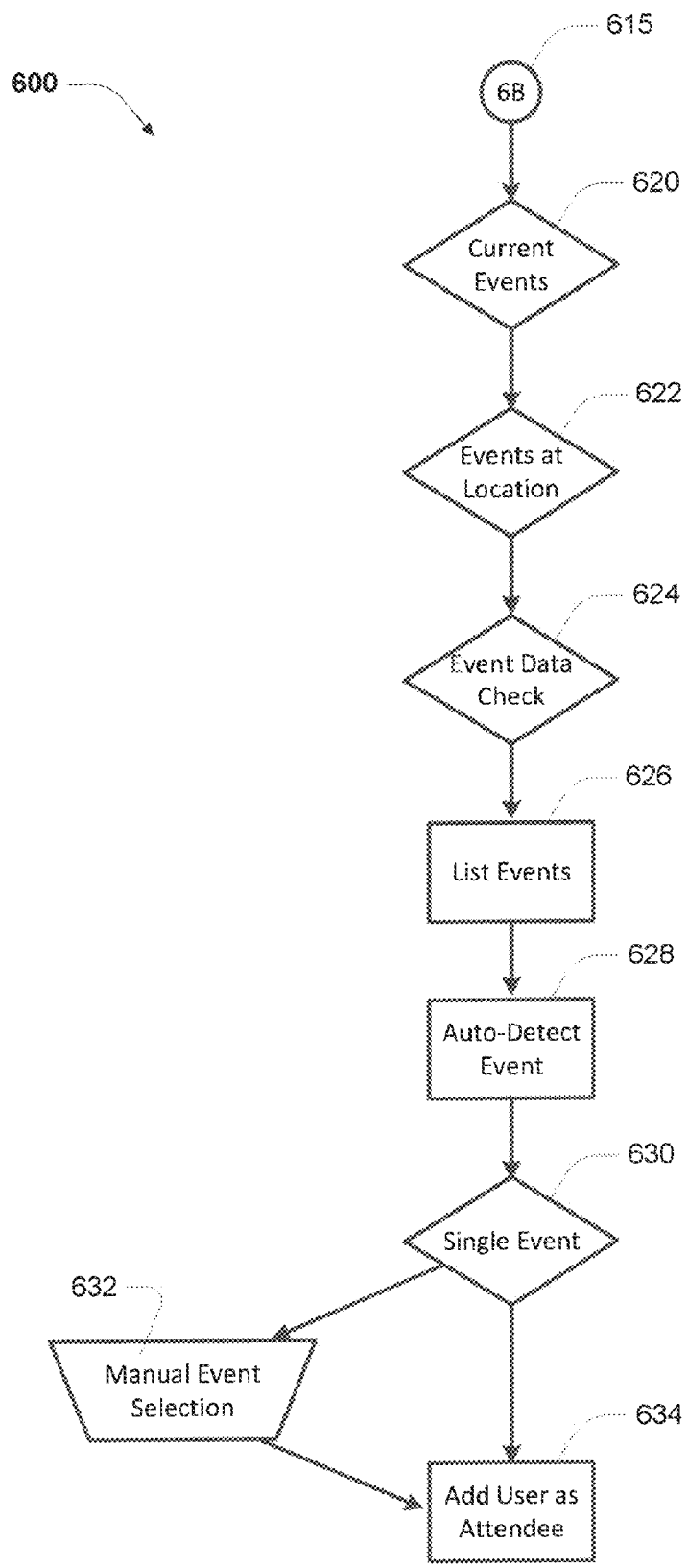
FIG. 6B is a process flowchart showing a method of joining an event.

According to an aspect of the technology, by way of example only, FIG. 6A and FIG. 6B shows a flowchart for a method of joining an event 600. The method 600 can include one or more of the following steps:

Step 601: providing a device or application coupleable to a data network for communicating to a server device—proceeding to step 602.

Step 602: determining if the device or application is associated with a user account (for example, having a security token that is validated by the server device); if no, proceed to step 603; otherwise proceed to step 604.

Step 603: creating a user account (for example, auto generating of an anonymous user account and returning a security token); proceeding to step 604.

Step 604: validating the user account (for example, validating a user token and/or granting permissions to the user account); proceeding to step 606.

Step 606: checking for events; proceeding to step 608.

Step 608: applying event permissions to create a list of potential events; proceeding to step 620 (at 615).

Step 620: determining a list of active events from the list of potential events; proceeding to step 622.

Step 622: determining a list of local events from the list of active events; proceeding to step 624.

Step 624: determining a list of accessible events from the list of local events; proceeding to step 626.

Step 626: providing the list of accessible events to a potential attendee; proceeding to step 628.

Step 628: determining a probable event or events from the list of accessible events that the user (potential attendee) may probably attend; proceed to step 630.

Step 630: determining if there is only one probable event, being an identified event; if no, proceed to step 632, otherwise proceed to step 634.

Step 632: enabling manual selection of probable events, thereby selecting one identified event; proceeding to step 634.

Step 634: registering the device/application account as an attendee at the identified event.

Regarding step 604, it will be appreciated that the user account may be initially verified or associated with an anonymous user. An anonymous account can be created with minimal data requirements. By registering a device or application instance, for example with a security token, a user account and password may not be required, but can be optional.

Regarding step 606, checking for events can be made manually or automatically. The device application can enable a user to manually check for events. The device application may also use location services to determine the location of the device (or user) to automatically and/or periodically check for events in the local vicinity.

Regarding step 608, applying event permissions may be dependent on data provided by location services (at 610), an event database (at 611), and a user database (at 612). By way of example, the event database may provide data relating to any one or more of the following: specific events; event boundaries (including multi-boundaries); event activity/inactivity; event creator; identified attendees at the event; an event pass phrase that may be required (optional); requirements for any existing connections (optional). By way of example, the user database may provide data relating to any one or more of the following: events created or attended; event photos taken; event photos appeared in; event history; event logins; device location history; event messages sent; and existing connections/friends. The events permissions can be applied to create a list of potential events.

Regarding step 622, the device or application may use location services to determine a current location of the device or user. The current location can then be used to determine appropriate events in the vicinity (for example based on a predefined radius, predefined polygon, or other selection criteria). It will be appreciated that an extended range may be used for defining the list of local events where an existing connections/friend of the user is already attending an event in that range.

Regarding step 624, additional verification can be optionally required for determining the list of accessible events. Any additional verification requirements are typically set by the event creator. For example, an event may require a potential attendee to have a pre-existing connection with an event attendee or event creator. For example, an event may require a potential attendee to provide a pass phrase. It will be appreciated that at step 624, permissions to initiate communication or access a contact card may be applied based on the type of event as described with reference to FIG. 5 (i.e. the tier of the event).

Regarding step 628, the number of shared connections/friends and proximity can be used as factors in determining probabilities that the user may potentially attend one or more available events. For example, a score can be increased for each connection/friend that is an event attendee. For example, a score can be increased based on closer proximity to an event.

Regarding step 634, registering the device/application account may include: granting permission to upload photos; granting permissions to view photos; granting permissions to communicate with other attendees; recording attendance at the event. Step 634 may further include determining and applying the type of event as described with reference to FIG. 5 (i.e. determining the tier) such that that the device/application can render the event appropriately.

User Communication

The system, by using facial isolation and recognition to associate attendees in uploaded photos to a device or application account, is adapted to provide a communication path between guests, attendees or registered users and providing contact information both parties.

By using a central server device that is coupled to (and communicate with) each device or application, it is possible for the server to provide a communication path between the separate devices or applications. The communication path may include, but is not limited to: short message services, text services, social media services, or voice over data services. In some embodiments, the system, or an attendee, can place restrictions on communication options.

By way of example, a server device can parse images uploaded to an event gallery for isolating portions of the image relating to individual faces or persons. The server device can associate or link//tag each individual face or person with an anonymous account or reference, which can occur prior to any facial recognition. Without facial recognition, or linking/tagging, of the portions of the image relating to the individual face or person—it is not possible to associate these portions of the image to a specific user account or attendee, but is possible to enable the server device to store a message from a sender until that person represented by that portion of the image is linked to a user account.

Figure 7:
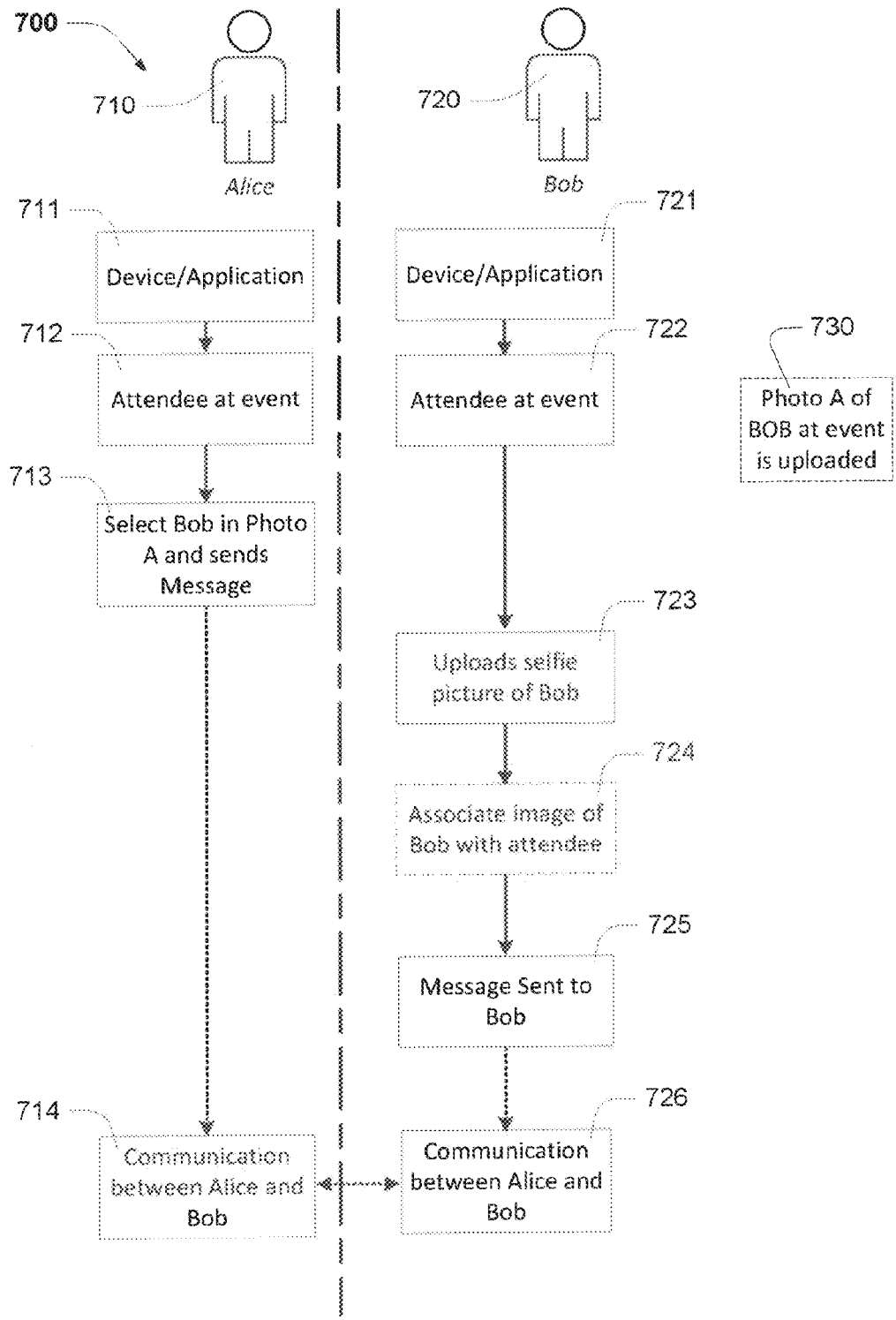
FIG. 7 is a process flowchart showing a method of creating a communication channel between two users.

According to an aspect of the invention, by way of example only, FIG. 7 shows a flowchart for a method 700 of communicating between two users 710 (first user Alice) and 720 (second user Bob). The way in which communication may occur will be described further with reference to FIGS. 14 to 20. The method 700 can include one or more of the following steps:

Step 711: a first user providing or using a device or application that enables registration or association with an event, wherein the device or application provides access to photographs connected with the event; proceeding to step 712.

Step 712: the first user registering the device or application as an attendee of the event; proceeding to step 713.

Step 713: the first user attendee displays a previously uploaded photograph comprising a face image of a second user attendee at the event, selects to enter and send a message to the identified second user attendee, wherein the system stores the message and links it to an account associated with the second user attendee.

The photograph 'A' (including the face of the second user Bob) can be separately uploaded by any authorised user of the system (at 730). The system (or server device) uses image and facial recognition to isolate and identify faces in uploaded photographs. Facial recognition parameters are calculated for each identified face in each of the photographs. Facial recognition parameters can then be compared to facial recognition parameters associated with registered users, devices or applications. The system (or server device) can, upon matching facial recognition parameters, associate faces in uploaded photographs to particular registered users, devices or applications, as well as with other matching faces in uploaded photographs. If no match can be found registered users, devices or applications, the system (or server device) can associate the face in an uploaded photograph to a temporary anonymous account, along with other matching faces in uploaded photographs. The temporary anonymous account can be later associated with a registered user device or application linked to a portrait image having matching facial recognition parameters. The association between identified faces in uploaded in our photos, registered users, devices and applications can be automatically performed by the system (or server device). Alternatively, an association can be made through manual selection of facial images.

Regarding step 713, if the system does not yet have any association for the facial image of the second user attendee, the message can be linked to a temporary anonymous account until associated with a registered user, device or application. The image can be pushed to a later registered user device or application.

For later registration of the second user attendee 720 (Bob), the method 700 can further include one or more of the following steps:

Step 721: coupling a device or application a server device that enables registration or association with an event, wherein the device or application provides access to photographs connected with the event; proceeding to step 722.

Step 722: registering the device or application as an attendee of the event; proceeding to step 723.

Step 723: uploading a portrait image of the second user attendee for linking the device or application; proceeding to step 724.

Step 724: associating facial parameters derived from the portrait image (as calculated by a server device) to the device or account; proceeding to step 725.

Step 725: sending/pushing the message from the first user attendee to the device or application of the second user attendee.

Regarding step 723, the portrait image can be associated with greater or lesser reliability depending on the source of the image. If the device or application is known to have taken the image at or during the event a higher level of confidence can be placed on the image for belonging to the registered user, device or application. It would be appreciated that, in some embodiments, a constraint can be applied that a new portrait image is directly taken and uploaded from the device or application at each event. Alternatively, if the device or application is already registered with a user portrait, in some embodiments, step 723 and step 724 can be bypassed.

In the event that the first user attendee 710 has a registered device or application, and server device facial recognition of photograph 'A' links the image to a second user attendee 720 registered device or application, the server device can enable a bi-directional communication between the first and second user device or application without disclosing contact details of either user.

Although the system can enable substantive anonymous interaction between attendees, some level of fraud protection and detection can be applied. Regarding step 725, it will be appreciated that the message or communication may take any form, and may include providing a contact card such as that described with reference to FIGS. 14 to 20.

Figure 8:
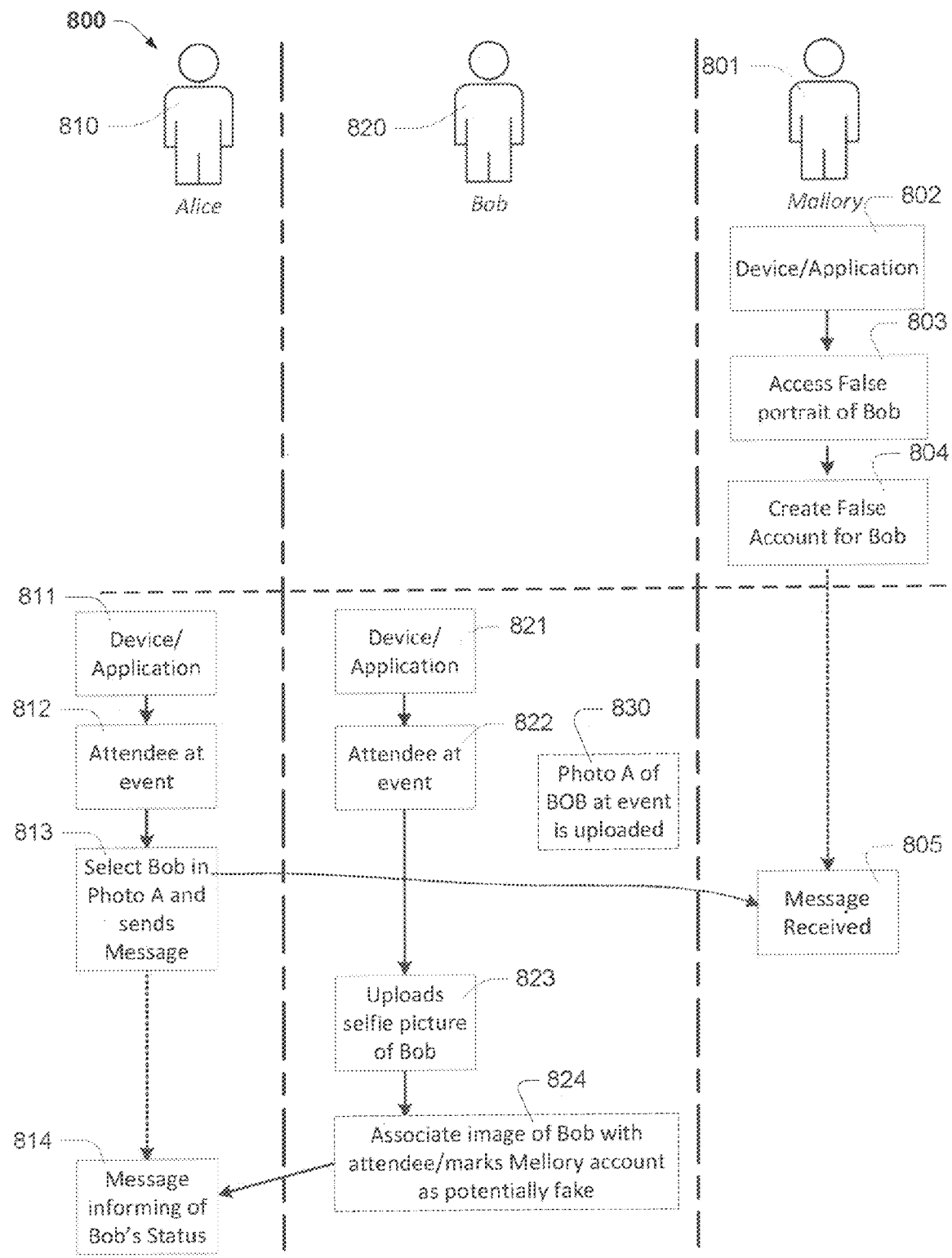
FIG. 8 is a process flowchart showing a method of creating a communication channel between two users, but involving a false/fake account.

FIG. 8 shows, by way of example only, a flowchart for a method 800 of communicating between two users 810 (first user Alice) and 820 (second user Bob), while initially having an impostor user 801 (Mallory).

In this example, an impostor user 801 takes steps to create a false account for a second user 820, comprising this one or more of the following steps:

Step 802: coupling a device or application a server device that enables registration or association with an event, wherein the device or application provides access to photographs connected with the event; proceeding to step 803.

Step 803: uploading a portrait image of the second user attendee for linking the device or application; proceeding to step 804.

Step 804: associating to facial parameters derived from the portrait image (as calculated by a server device) to the device or account.

In an embodiment, it will be appreciated that the impostor user 801 may not know about the existence, location or duration of the event. The impostor user may also not know any other user will be attending.

The photograph 'A' (including the face of the second user Bob) can be separately uploaded by any authorised user of the system (at 730/830). The system (or server device) uses image and facial recognition to isolate and identify faces in uploaded photographs.

The method 800 associated with the first user attendee is similar to the previous example, and can include one or more of the following steps:

Step 811: a first user providing or using a device or application that enables registration or association with an event, wherein the device or application provides access to photographs connected with the event; proceeding to step 812.

Step 812: the first user registering the device or application as an attendee of the event; proceeding to step 813.

Step 813: the first user attendee displays a previously uploaded photograph comprising a face image of Bob, and selects to enter and send a message to the identified attendee.

In an embodiment, it will be appreciated that the facial parameters for Bob derived from photograph "A" will be associated with the impostor user 801 device or application.

The impostor will then receive the message intended for Bob (at 805), but the message will not contain any sensitive data or contact formation from the user database or event database.

The method 800 associated with later registration of a second user attendee is similar to the previous example, and can include one or more of the following steps:

Step 821: coupling a device or application a server device that enables registration or association with an event, wherein the device or application provides access to photographs connected with the event; proceeding to step 822.

Step 822: registering the device or application as an attendee of the event; proceeding to step 823.

Step 823: uploading a portrait image of the second user attendee for linking the device or application; proceeding to step 824.

Step 824: associating to facial parameters derived from the portrait image (as calculated by a server device) to the device or account.

Regarding step 824, associating facial parameters derived from the portrait image would conflict with the false account created (at 804). As the second user is an attendee there is a higher presumption of validity in the second user device or application. This presumption of validity can be further improved where the portrait image is directly created and provided by the device application at the event. If the presumption of validity resides with the second user, the false account created (at 804) can be marked as a "fake".

The server device, if marking the false account created (at 804) as a fake, can message first user device or application notifying of the validity status of the second user account and the potential that the message sent (at 813) may have been forwarded to a false account. It will be appreciated that the probably of false accounts being created can be reduced by more stringent registration requirements. Any registration requirements would need to be balanced against ease-of-use and free access to the communication system.

In an embodiment, a user may opt in or opt out of receiving communications from other users. By way of example only, in the case where a user has opted out of receiving communications, the server device may still identify individuals in uploaded photograph through facial recognition, and allow a message to be stored and linked to temporary anonymous accounts, but not delivered. By way of example only, in the case where a user has a registered device or application with linked facial recognition parameters and opted out of receiving communications, the server device may still identify individuals in uploaded photograph through facial recognition but not assign any references to recognise users that have opted out.

The functionality of a user tapping on an image of a person's faces to commence communication can apply to any attendee appearing in a photograph taken at an event, or even uploaded to the server device. If the server device does not yet have matching facial recognition parameters for the person associated with a registered user, device or application—the message may be temporarily held until it can be delivered.

In some embodiments, the functionality of a user tapping on an image of a person's face may be made available by means of an application programming interface (API) call. Namely, third party applications e.g., a bot (a computer program that operates as an agent for a user or other program or to simulate a human activity, for example, a tap on an image of a person's face) may communicate not directly with a user device, but rather through a device service. The device service may provide a corresponding signal to the target user device based on one or more factors such as facial recognition parameters for the person associated with a registered user, device or application.

User Interface

The device or application provides a simple interface to create and access event image galleries. Guests can easily join an event as attendee, and quickly start contributing photos. Event galleries can be finalised and/or shared with guests and the general public at the discretion of the host or event creator.

The device or application may further provide a public communication function which allow private communication by clicking on any image of a person in an event gallery without needing any other means of identifying the person (such as manually tagging the photo and linking the tag to a user account). A communication can be sent to the target user identified in the photo, and stored before the target has claimed or registered their identify. This may be done by way of a contact card such as that described with reference to FIGS. 14 to 20. The "address" for the message is a biometric parameter (e.g. facial appearance), not a construct (email/phone number) or a location (mailing address).

The system (server device) and device/application can allow joining an event based on current location—thereby avoiding the need to send invitations, codes, email links, etc.

The system (server device) and device/application can allow photos to be uploaded to an event gallery without formally creating a user account—thereby allowing photographs to be added in a less restrictive manner while retaining options to restrict viewing of event galleries.

The system (server device) and device/application, by allowing simplified access to uploading photos to an event gallery, can reduce the chance of photo collections being fragmented or incomplete.

The system (server device) and device/application can enable a host or event creator to approve images, and/or apply style/filters to each image, before inclusion in an event gallery.

The system (server device) and device/application is adapted for an improved event/host/guest experience, not a bolt-on to a general social media experience.

The system (server device) and device/application requires fewer/minimal steps to get started and contribute to event photos—avoiding need for emails/phone numbers/passwords etc.

The system (server device) and device/application enables security in a user-friendly way.

The system (server device) and device/application enables the following advantages:
a) Using current location to join/unlock/access an event.
b) Using location-based, presence of user at an event time/place.
c) Reduced security burden to add photos (whilst maintaining full security to view photos).
d) Defer higher-security steps to avoid impacting uptake.
e) Automatically identify malicious users joining an event. e.g. Scan for suspicious behaviour, IP address, etc.
f) Convenient tools to manually deal with uninvited users. e.g. Eject a user from event and automatically remove all photos by that user.
g) Automatic and semi-automatic tagging of people in images.
h) Users can comment on a photo and identified persons appearing in the photo can be notified.
i) Users can send non-private messages to a person appearing in a photo before they have an account, and before they have been identified in the photo.
j) Users can send private messages once each participant has a full account (e.g. by entering email/mobile number). Private messaging can be initiated by selecting a person appearing in the photo.

An event collection can include data associated with the location, start time, duration and photos uploaded. The location and range may be adjusted in real time, based on the attendee distribution. The duration may also be adjusted in real time based on the number of attendees at the event.

An event can be created (with sufficient richness to be useful) by pressing a single button on the device or application. In this example embodiment, event creation may include any one or more of the following attributes:
a) assuming the event will commence immediately, using the current location of the user event creator as the basis for defining a location for the event;
b) assuming a default event duration (e.g. 3 hours), an event duration can automatically extended while there is sufficient activity at the event (for example, continually extend the duration beyond 3 hours if there has been activity at the event location in the last 60 minutes);
c) the device or application can automatically enable a guest to join an event when the location service of the device or application identifies its location is within a boundary of a current event;
d) private/secure events can be created and maintained by requiring a predefined secret passcode or knowledge test prior to entry (a passphrase is typically not immediately required because the initial empty event does not contain sensitive information);
e) photo privacy can be managed and maintained, while still allowing anonymous users to upload photos (which does not leak potentially sensitive information), wherein more stringent created specified permission requirements are applied when retrieving/viewing photos.

Joining an Event

The server device, user device or application can enable a user to join an event automatically, and contribute photographs to the event gallery without requiring permissions to be set. In this scenario, the user device or application is identified (accepted as an attendee) by the server device while still allowing the user to be otherwise anonymous. The user identity associated with the device or application can be verified through the submission/uploading of a portrait image (or other means) at a later date or time.

The server device enables joining and permissions, to permit submission of event photos to the event gallery, through one or more of the following steps:
a) identifying the user/device/application as being present at the event. The device or application can report a current location, during the event period, such that server device can determine that the user is a current attendee at the event.
b) submitting a portrait image via the device or application (either captured through the application or selected from an existing photo sourced) to the server device, may be used by the server device to determine facial recognition parameters that can automatically associate permissions to access particular event photos and messages.

The server device, user device or application can typically avoid the need to manually select, or reduces the selection options, between events that are occurring in close geographic and temporal vicinity by:
  a) Using other available data to automatically detect the correct event, such as previous interactions with already-joined-guests at the event;
  b) Dynamically adjusting event boundaries based on how many events are nearby. For example, if only one event is active in the nearby area, use a generous/large radius to make it easy to join (e.g. 1 km). Alternatively, if two events are active in close proximity, auto-join if the user is very close to the event location (e.g. With 20 meters) but allow them to join by manually selecting the event within 1 km.
  c) Providing manually selection between multiple events that the user/device/application may be attending.

Additional security constraints can also be applied as a special configuration on the event. For example, if physical presence at the event is insufficient.

It will be appreciated that application some security constraints can be deferred until data/photos are retrieved, while not affecting the ability to upload images to the event gallery. This approach can maintain a high level of security for accessing potentially sensitive photos, whilst not imposing a burden on the less sensitive photo submission process.

Such security constraints may include one or more of the following:
  a) Requiring a passcode that has been shared to invited guests;
  b) Requiring an answer to a question or hint. This may enable potential valid attendees to implicitly know the answer for the particular event, without the need of sharing a passcode. For example, requesting the user to enter the event postcode, name with the event venue, the Host's middle name, or host's date of birth.
  c) Requiring a pre-existing relationship(s) with guests, existing attendees or the event organizer.

The device and application can also assist in security by limiting the ability to fake device locations for gaining access to different events. Such measures or techniques in the application or server device can include:
  a) Throttling the speed at which location can be updated
  b) Monitoring device and application usage and location to detect suspicious or abnormal activity
  c) Using other available data (such as nearby wi-fi networks or cell phone towers, which can be further cross-referenced with existing attendees) to verify that the device and application is at the claimed location.

In some embodiments, the server device, user device or application can enable a user to join/attend an event when either:
  a) the user/device/application are not currently at the event location; and/or.
  b) before/after the event has finished in order to contribute photos to, or retrieve photos from, the event gallery.

It will be appreciated that, in the above circumstances where the presence at the place/time of the event cannot be verified, a higher burden of proof or security may be imposed to gain access. Such additional security may include one or more of the following:
  a) Requiring the user to enter an event passcode.
  b) Requiring an explicit invitation to join the event from an organizer or attendee (for example, by sharing a secure link).
  c) Requiring the user to upload a selfie, where the server device can verify they also appear in at least one of the event photos
  d) Requiring connection(s) with the event organizer(s) or attendee(s).
  e) Requiring an uploaded image already tagged before or during the event.

Communication channels utilising facial recognition.

The server device, user device and application can enable a communication channel between event attendee.

The method for initiating a communication channel can include:
  a) Using the device or application to view a photo from an event gallery having a person tagged/identified by a server device using facial recognition techniques;
  b) Selecting (for example, clicking or touching the person's image in the photo (or the tag) to open a communication channel with that person as shown with reference to FIGS. 14 to 20.

In an embodiment, the communication channel can include one or more of the following:
  a) Opening a messaging feature on the sender's device or in the sender's application, typing a message and sending it. The message would be directed to the recipient's device or application, and a notification of the message can be sent to the recipient (for example, a sound or visual indicator).
  b) Launching or opening a message feature on the recipient's device or in the recipient's application enables a two-way communication channel with the sender of the original message.

It will be appreciated that, a preferred communication method may be configured by the recipient and/or sender (for example, email, short message services, electronic messaging, etc), whereby the server device can be the communication channel for the message. In some embodiments, the server device can withhold contact details, and remain an intermediary in any communication channel, thereby allowing communication across data modes (for example, email to/from SMS).

It will be appreciated that, interactions between attendees can create ongoing social or professional relationships between users. User connections can be recorded in a user profile stored in the user database. A user connection can be recorded explicitly (e.g. friends/colleagues/) and/or implicitly (e.g. common attendances, pass communications).

Further features and process steps may enhance the initiation of establishing a communication channel. Such features and process steps may include any one or more of the following:
  a) Identify individuals in uploaded photos to create a collection of all photos containing each individual (using facial recognition software). This can include: (i) detecting images of faces/people in all uploaded photos; (ii) For each face/person detected, find similar faces/people in other photos which are likely to depict the same person; (iii) link the identified instances of an individual in separate photos driven primarily by imagery within event galleries, so an individual does not need to be known in advance or have an account.
  b) A user/attendee may use the device or application to identify ("tag") themselves in one or more uploaded photos (for example, by indicating that a particular face/person in a photo is them). This can include: (i) the user's device/application/account is associated with matching facial recognition parameters; (ii) faces/people with similar facial recognition parameters in other photos (matched earlier anonymously) may be auto-tagged and linked with the same user account; (iii)

additional refinements or quality checks may be iteratively applied to maintain a robust collection of photos in which the user appears.

c) Initiating a message directed to a user whose face appears in a photo, can be routed to the user who has been associated/tagged. If the face/person in the image has not yet been tagged with a specific user, then a message can be saved to a temporary mailbox associated with that image/face/person which can be claimed at a later date.

d) Supporting processes can deal with "special" cases such as: (i) identical twins or people who look very similar; (ii) an image "squatter" whose 'selfie' profile images are not of themselves.

It will be appreciated that references to "face" and facial recognition can be generalised or extended to include recognition of other aspects appearing in a photo, including: other physical anatomy, clothing, time and location the photograph was taken, etc.

It will be further appreciated that references to an event "location" or "boundary" may be defined by a radius/perimeter, polygon, established floorplan, or other physical or stochastic modelling.

Event Co-Attendance Model

Social networks typically rely on manually creating and/or verifying connections between users which is cumbersome and blocks many interactions until explicit connections are made. In an embodiment of the present technology, loose associations can be inferred. Co-attendance may be used to replace traditional social media "connections".

Using co-attendance can enable an interaction model to leverage co-attendance at an event to infer a basic connection between the users which grants some basic privileges, avoiding the need for explicit permission until more intrusive interactions are attempted.

Figure 9:
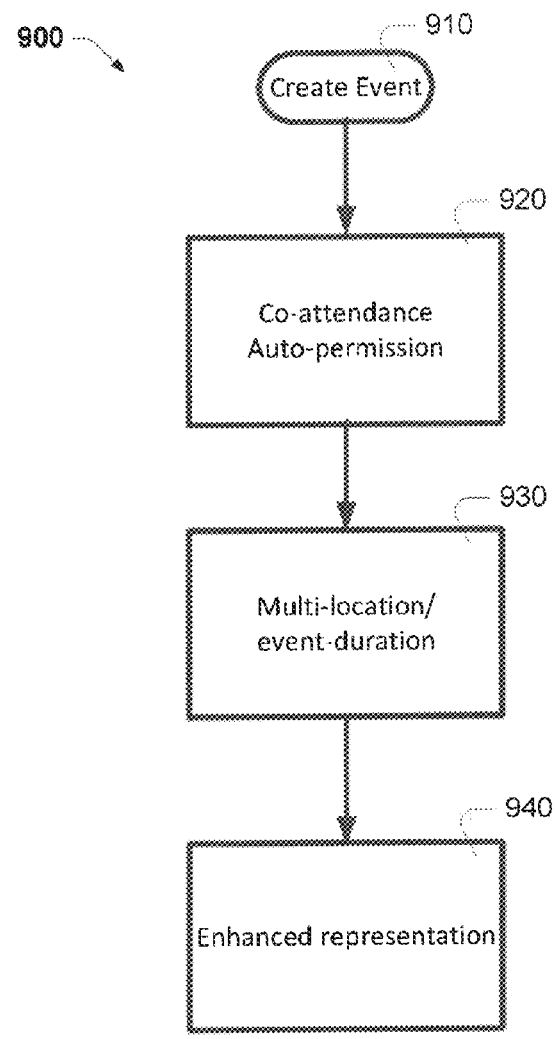
FIG. 9 is a process flowchart showing a method of creating an event using co-attendance.

FIG. 9 shows a flowchart for a method of event creation 800 utilising co-attendance. The method includes the steps of:

Step 910: Selecting event creation, typically at the event location and event start time.
Step 920: generating permissions.
Step 930: reviewing multi-location and event duration.
Step 940: representing multi-location events.

It will be appreciated that event creation can be initiated at the location and start time of an event, and established and maintained in an event database in real time. Further automation of event maintenance is available using co-attendance modelling.

Referring to step 920, the permissions can be automatically established using co-attendance. This may remove the need to pre-prepare guest connections and contact details. This may further remove any need to require invitations or access permissions.

Referring to step 930, the server device can automate identification of multi-location events and flexible duration of events. This may remove the need for an event creator to provide event location, event start time, event duration, event boundary. It will be appreciated that user access is improved by removing requirements for manual steps of providing event details (including event location/start time/duration/boundary).

Referring to step 840, the server device can maintain and enhance representation of multi-location events. The server device can identify attendees linked to an event over multiple locations. Modelling of separate locations can include heuristic and probabilistic mapping of attendees. Separate modelling of events at each location can include automated event commencement and completion.

In an embodiment, co-attendees can see who attended the event, and may message each other without having any other connection, subject to server device imposed security (for example based on a recipients profile settings).

Challenges of using co-attendance as a connection includes balancing:

a) Granting too many privileges based on co-attendance does not protect users sufficiently and makes connections less meaningful.

b) Granting insufficient privileges based on co-attendance makes it little more than a list of people who attended an event.

In an embodiment, anonymous participants or attendees can be allowed. This gives rise to a number of problems and solutions. As photographs can contain private/sensitive content, a host or attendee need a degree of control over how they will be accessed. Photo sharing applications typically require manually granting access over content. The current technology applies ruleset which regulates anonymous access (based on location—at/during—event), so that users no longer need direct control over permissions. This enables a permission step to be removed without losing reasonable control and protection. Knowledge may be required about guests in advance of an event, in order to allow them to participate in an event whilst having some control over what they can/cannot do. An email address or username can be required for granting permission to view/contribute to the event.

Data associated with the behaviour of a user, device or application can be analysed to identify a person as legitimate or spoofing. Given that permissions can be granted based on location, spoofing location may fraudulently enable gaining of permissions. Measures can be employed to prevent or mitigate location spoofing, including:

a) Tracking user location history for anomalies. For example, activity may be flagged as potentially malicious if user location changes faster than is physically possible or realistic, such as the device or application recording two locations that would require a travel speed of over 1000 km/hr. Determining whether user activity/location is "realistic" could account for traffic, likely modes of transport, etc.

b) Tracking device sensor data such as: device orientation, nearby Wi-Fi networks, signal strength, method of device authentication (e.g. face id), etc. for example, activity may be flagged as potentially malicious if device orientation/motion no device motion or change in orientation has occurred. Device data can be cross-referenced with other attendee device data.

c) Considering the device type. For example, certain devices may be more commonly faked/spoofed, and therefore less trustworthy.

d) Tracking user activity history and connections. For example, users/accounts with a suitable history of activity and multiple connections with other users or attendees may infer greater reliability that the user/account is not a bot, application running on an emulator, or device using spoofed location data.

The server device, user device and application may use adaptive multi-locations/boundaries for an event. A location for an event can include multiple distinct locations, and can change over time (for example, preparations before an event, off-site photo shoot, moving to an after party, etc).

The current technology enables any one or more of the following:

a) Creating an event that requires specifying of a start time, which can be provided at the start of the event. By allow physical presence at all during and event to automatically grant some permissions, there is no need to send invitations/permissions in advance. It is possible to create an event at any time, even after the event has started.

b) Creating an event that requires specifying of a location or locations, which can be provided by the device when initiating the event at the start time. Since the event entry does not require advance creation, the location of the device at the time the event creation may be used to automatically populate the event location. The server device may enable an event creator/host to combine multiple events (particularly for multilocation events).

c) Implementing enhanced event location models, allowing an event entry to: (i) include multiple discrete locations; (ii) change event locations over time (for example, adding/removing event locations during the event); (iii) represent event location with richer models including: polygons, multi-polygons, probabilistic models which map locations to likelihood of belonging to an event (for example, based on a venue floorplan or street map).

d) Implementing Enhanced event duration/completion models, allowing the event entry to: (i) record event as "active" or "completed", assisting identification of event attendance and granting permissions to the event; (ii) independently recording each individual location should be marked as "active" and "completed" at the correct time. It will be appreciated that some users/attendees may provide greater weight in determining when an event location is active or completed (for example, location of an event organizer, VIP, heavily connected user, or heavy content contributor may be a reliable indicator of event status).

e) Differential treatment between users joining an event and users that have already joined the event. Users who have already joined an event may be allowed to continue participating in the event even after it has been closed to new users joining (for example, people already identified as attending an event may be allowed to continue adding photos to an event gallery, even as other users at the same location may be prevented from joining).

f) Implementing Automatic/Dynamic Event Location closure. It will be appreciated that, accuracy in event closure is important, whereby: (i) early marking an event as completed will prevent users from participating in the event; and (ii) late marking an event as completed may result in non-attendees gaining access to the event. The technology is adapted to automatically mark an event location as "closed" in a timely/reliable/robust manner by analyzing: (i) user activity, including user/guest location, photo locations, app usage. (For example, tracking user location can indicate that guests are departing a venue and that event location should be closed (ii) data from similar events for allowing inferences to be made (for example, the likelihood of event location continuing to be used for further activity at any given point in time).

g) Implementing machine learning or artificial intelligence approaches to manage both location and duration.

h) By employing machine learning methods to improve quality of inferences regarding event location and event duration/completion. Input data can include one or more of the following: (i) event creation parameters (e.g. time and location of event creation, plus other optional settings); (ii) user activity; (iii) user locations over time; (iv) user connections; (v) user photos contributed; (vi) user profile (e.g. a user with close connections to event attendees will be more likely to be allowed to join/contribute). Output inferences may include one or more of the following: (i) event locations (e.g. a 2D probabilistic map of likelihood of new users being attendees for a particular event; (ii) a new user being allowed to join (e.g. Yes—any user, Yes—only if sufficient connections with existing attendees, Yes—only if passcode provided, or No); (iii) existing attendees being allowed to contribute (e.g. Yes—any attendee; Yes—only if sufficient connections with existing attendees Yes—only if event organizer; or No, closed for all users).

User Device and Interface

FIG. 10 through FIG. 13 show, show by way of examples, a user device 1000 and associated application user interfaces 1001 1101 1201 1301 for creating an event, joining a public event, joining a closed event, and communicating with an attendee (respectively).

Figure 10:
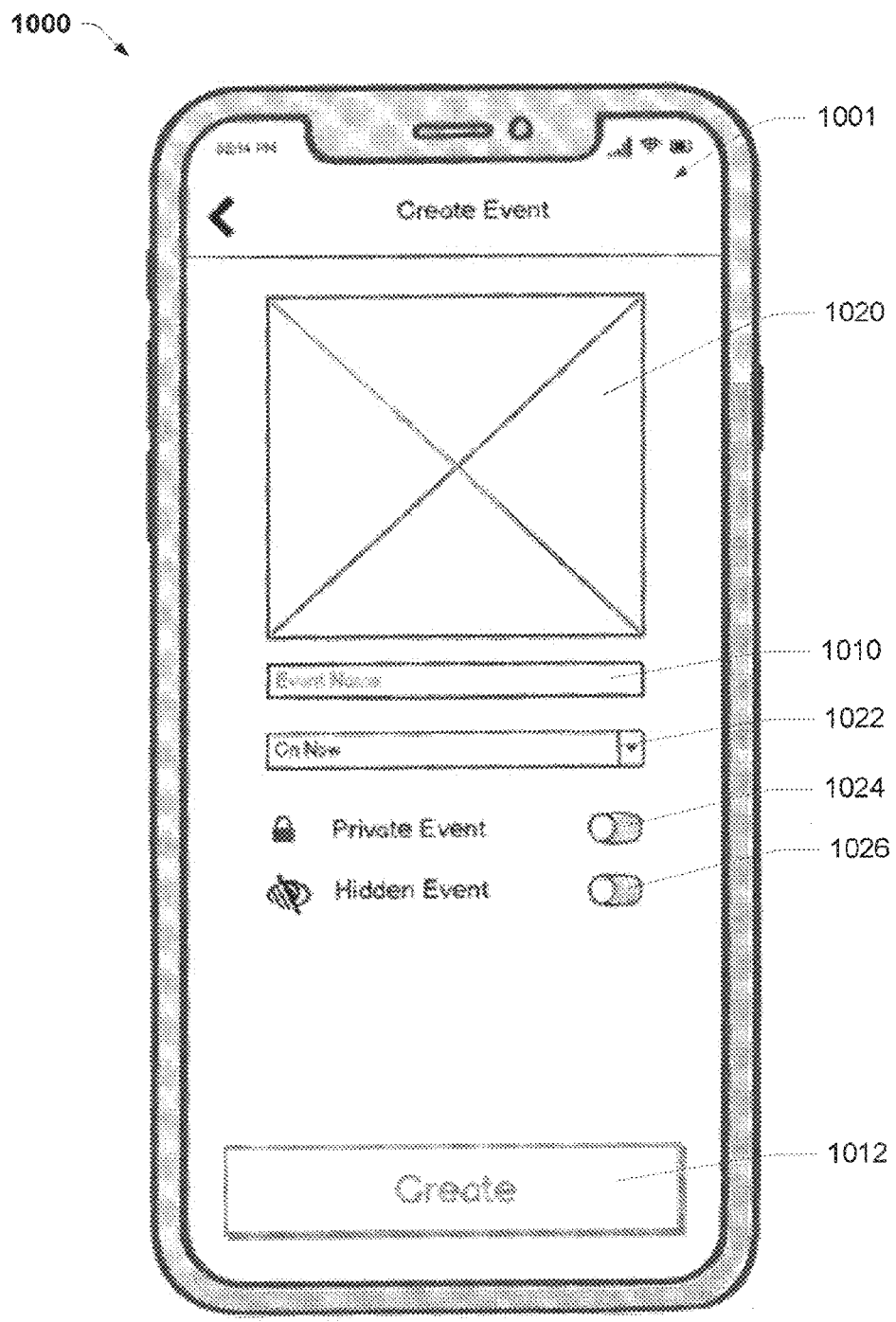
FIG. 10 is a schematic view of a user device and interface for creating an event entry.

Referring to FIG. 10 an event can be created through an application 1001. The applicant has a number of default settings. Upon entering an event reference or an event name 1010, an event can be created at the current location commencing at the current time through selection of "create" 1012. An event reference may alternatively be pre-generated by the server device, user device or user application. Optional settings include: adding an event cover photo (at 1020), specifying an alternative time (at 1022), specifying the event as private (at 1024), or specifying the event as hidden (at 1026).

By specifying the event as private, a secret question or pass phrase can be set. By setting the event as hidden, hides the event from current users until it is un-hidden or published.

By selecting "create" 1012, an event can be created at the user's current location (as determined by the device using a location system, for example GPS or cell phone location).

The event creator may change the location and time of an event. The event creator may also set image filters to be applied to photographs uploaded to an image gallery.

Figure 11:
FIG. 11 is a schematic view of a user device and interface for joining an event.

Referring to FIG. 11, a device 1000 or application 1101 may join a public event (at 1110) based on the current location. A user may select other possible events (at 1120) or a gallery view (at 1122).

A user can select to take or upload a photograph (at 1130), which uses a camera on the device or a local image gallery.

Figure 12:
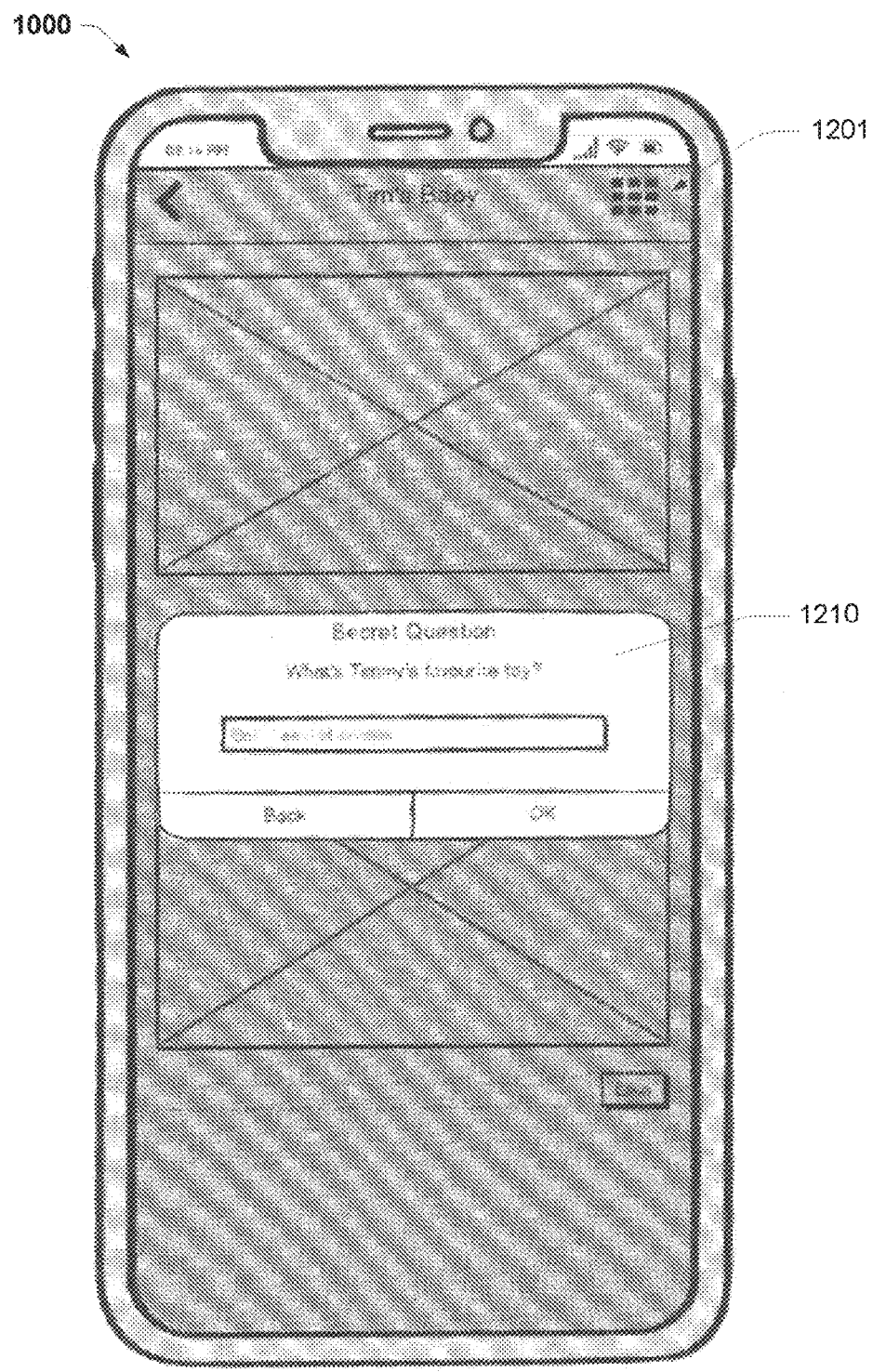
FIG. 12 is a schematic view of a user device and interface for joining an event.

Referring to FIG. 12, a device 1000 or application 1201 may join an event by answering a security question (at 1210). This allows access to the event, similar to joining a public event as taught above.

Figure 13:
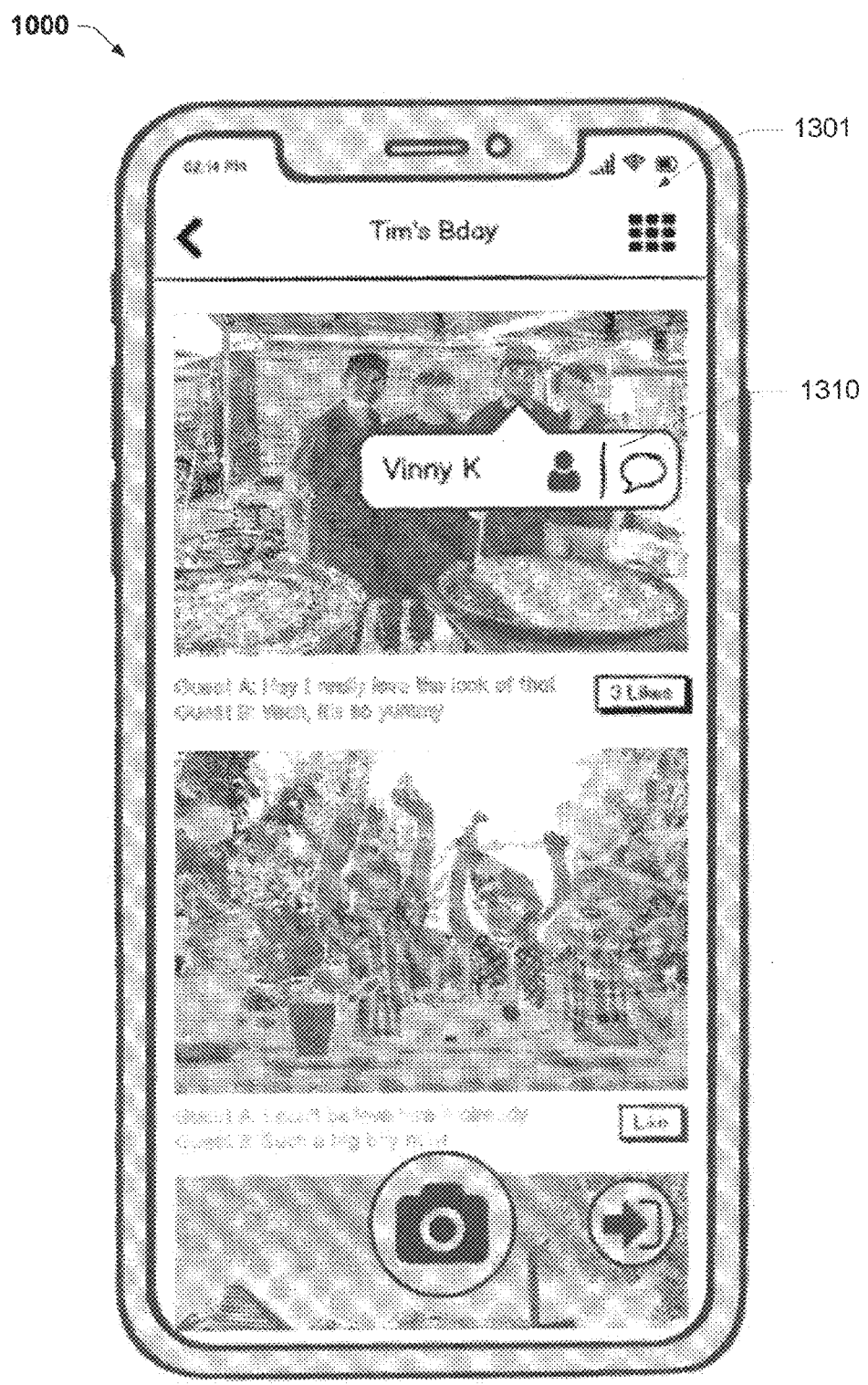
FIG. 13 is a schematic view of a user device and interface for communicating with another person depicted in an image of the event archive.

Referring to FIG. 13, a device 1000 or application 1301 enables a user to communicate with an identified attendee at an event. In this example, the identified attendee has been tagged by a server device in a photo contained in the event gallery. Selection of the identified attendee (at 1310) enables the user to submit a message for the identified attendee (whether the attendee is anonymous or a registered user).

Figure 14:
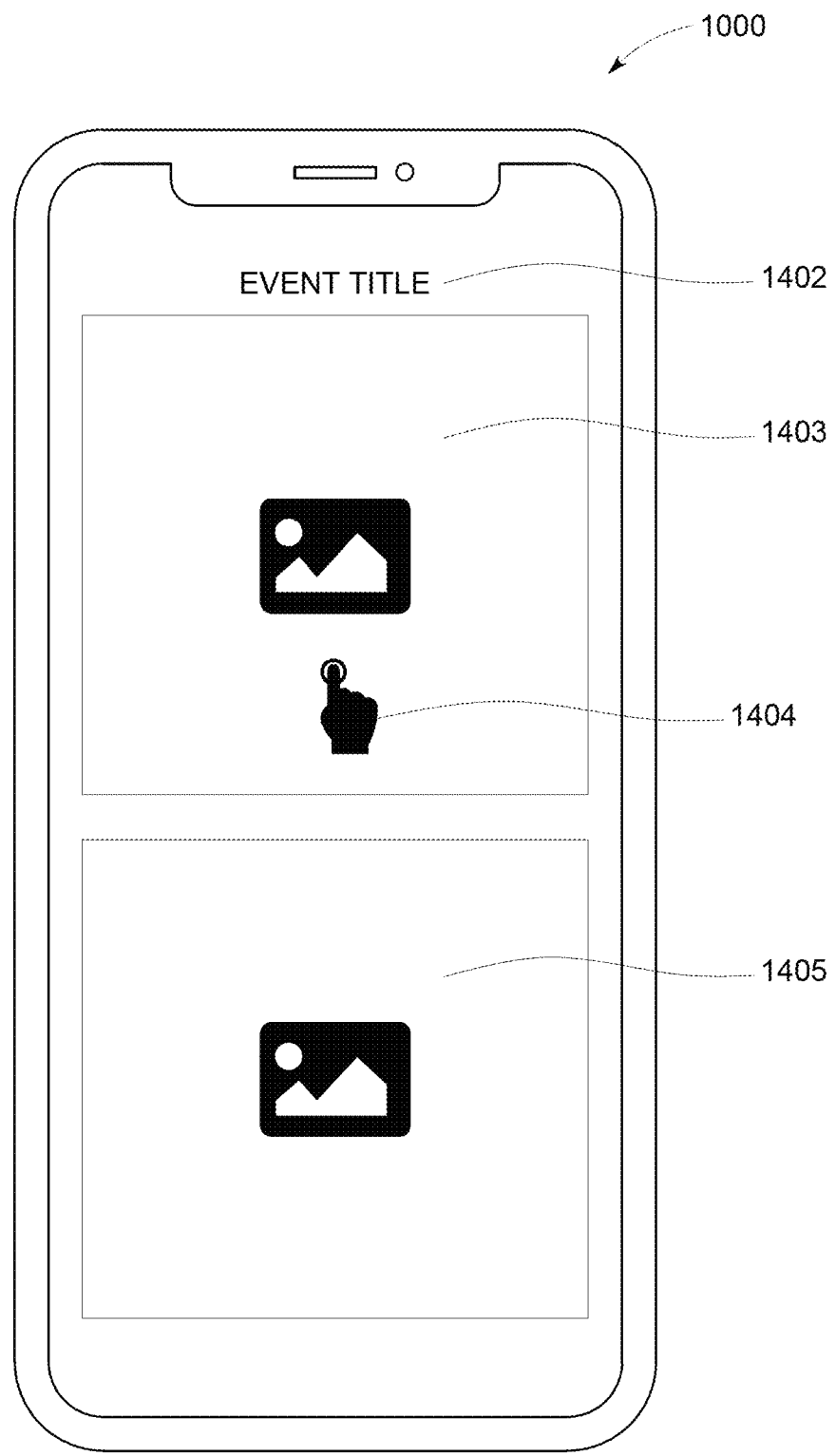
FIG. 14 is a schematic view of a user device and interface showing an image where attendees have been tagged by a server device.

Referring FIG. 14 through FIG. 20 show, by way of examples, a user device 1000 and associated application user interfaces. Referring to FIG. 14, a device 1000 or an application or 1001 enables a user to communicate with an identified attendee 1002 by they may browse photos 1403, 1405, in an event gallery where attendees have been tagged by a server device. The photos 1403 and 1405 for example, may be selected by tapping 1404 on the device 1000.

Figure 15:
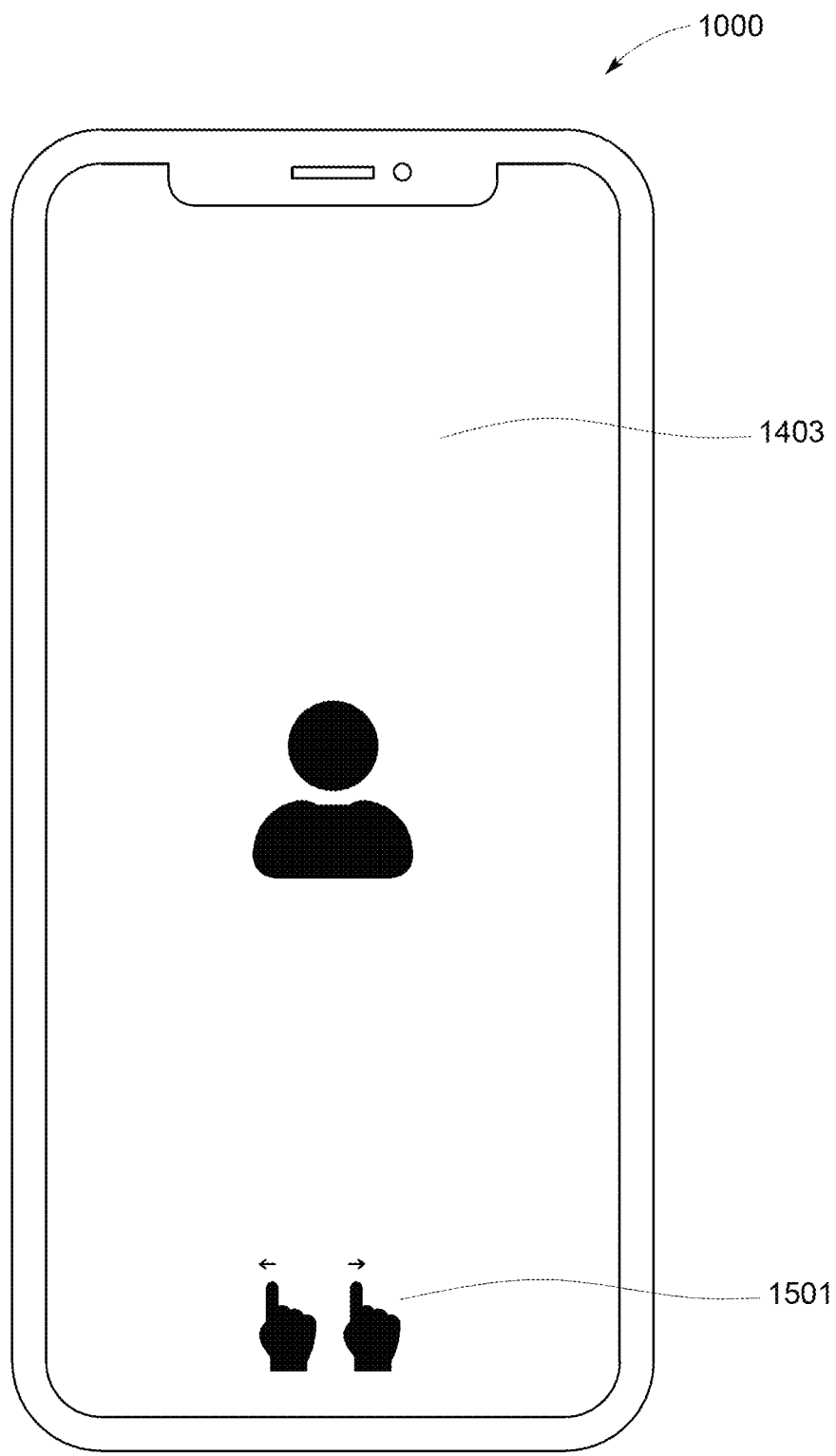
FIG. 15 is a schematic view of a user device and interface from FIG. 14 once the image has been tapped.

Referring to FIG. 15, a device 1000 showing the photo 1403 from FIG. 14 once it has been tapped 1404—in which a full-sized version of image 1403 may be presented on device 1000. The user may swipe left and right 1501 on the image to move to the preceding image. At this point, if the user taps on the image, they will be provided with the contact card of the user, which may include displaying details of the user, the ability to connect and/or the ability to chat to the user.

Figure 16:
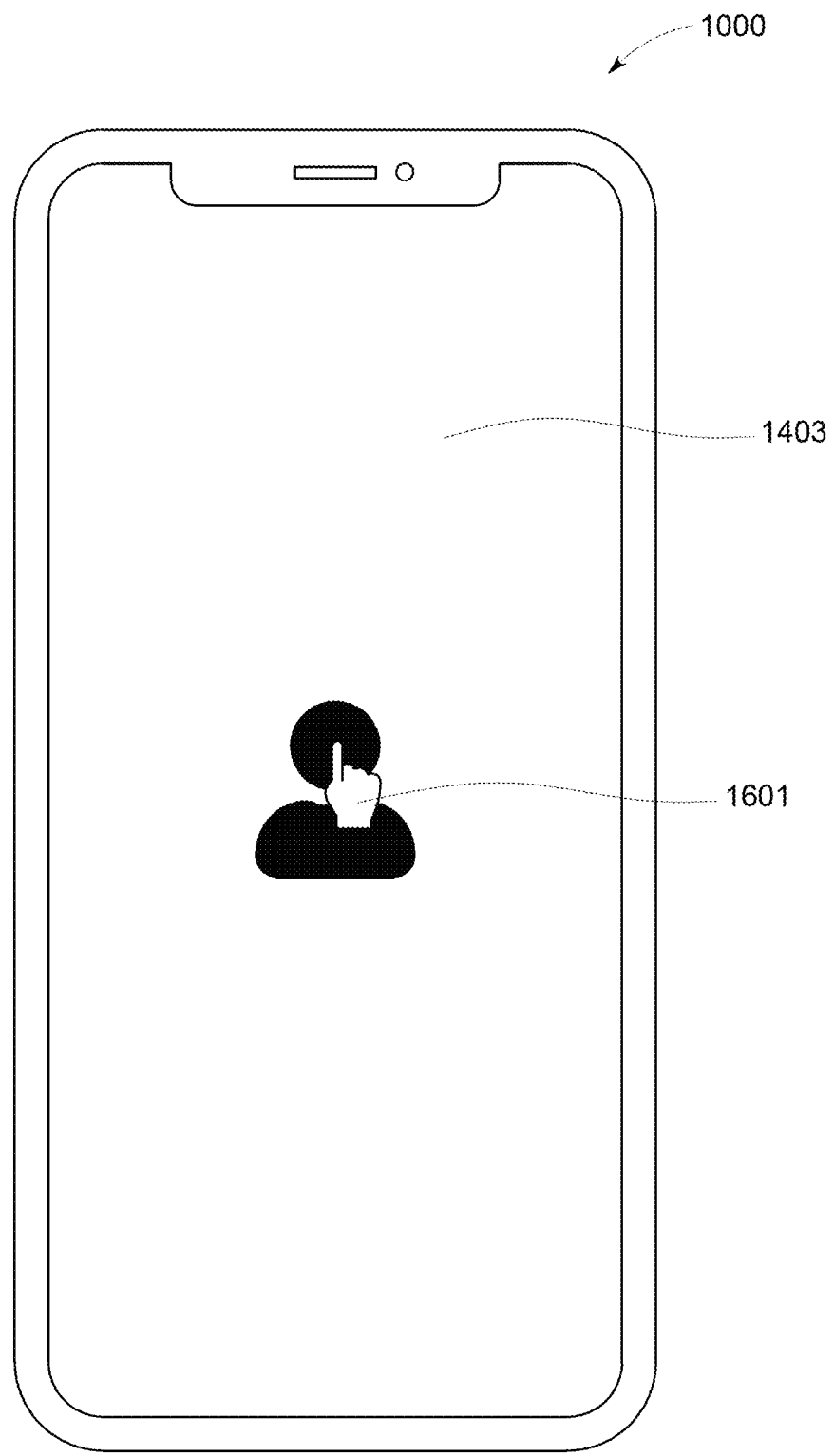
FIG. 16 is a schematic view of a user device and interface showing a user initiating communication with an identified attendee at an event.

Referring to FIG. 16, a device 1000 which enables a user to communicate with an identified attendee at an event is shown. In FIG. 15, once the user has swiped 1501 through the images which they wish to engage with the user by having identified a user in the photo 1403 they may select that user by tapping 1601 on the image of the user.

Figure 17:
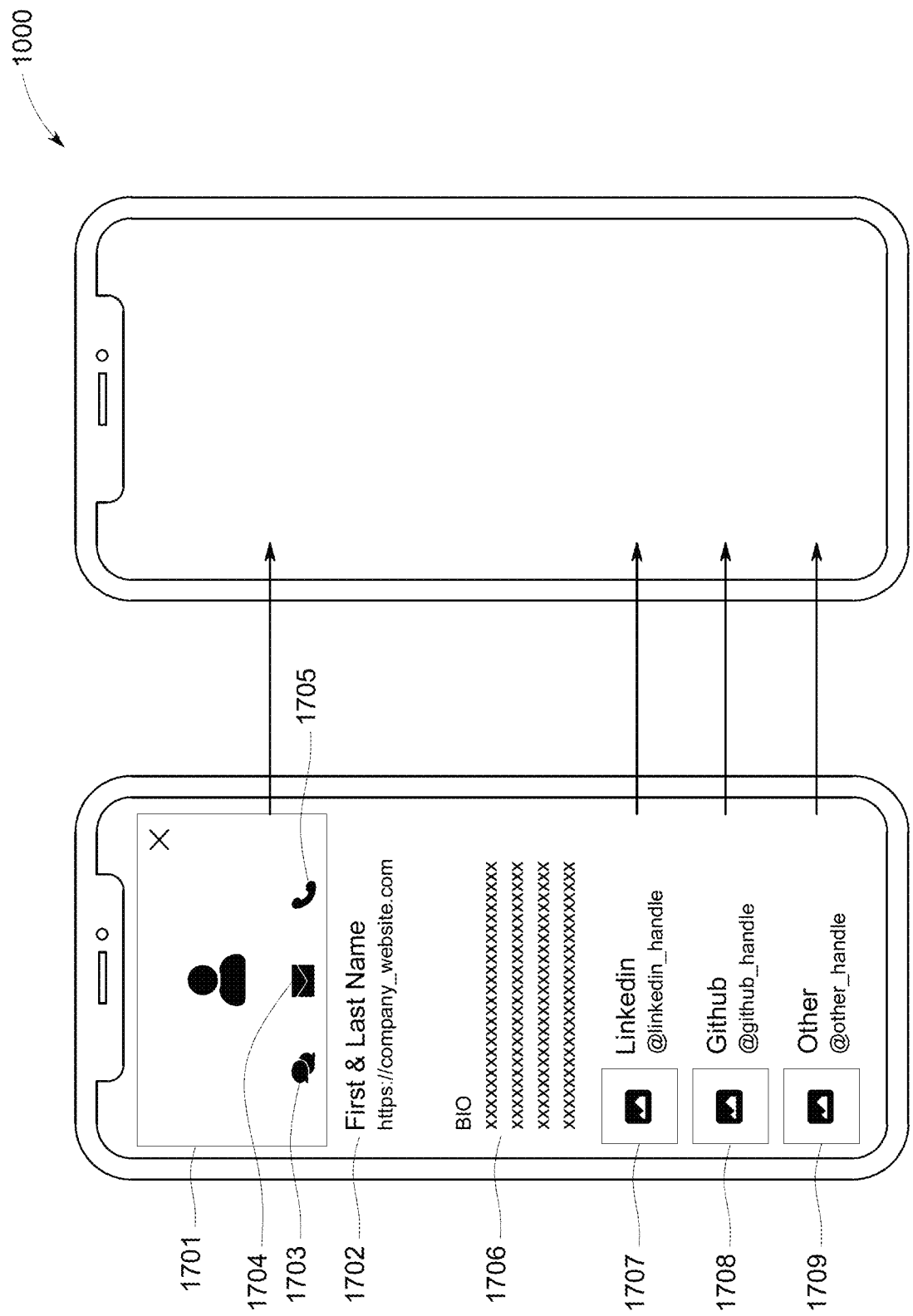
FIG. 17 is a schematic view of a user device and interface showing detail of a user communicating with an identified attendee at an event.

Referring to FIG. 17, a device 1000 which enables the user to communicate with an identified attendee at an event is shown. By clicking on a photo at the event and upon clicking a photo of the individual, such as described in FIG. 16 (by tapping on photo 1403) the user is presented with the information relating to the individual in the photo. The information may take any form but in the present embodiment the user may be provided with tile 1701 which includes a photo of the individual which may be the same photo from the image 1403 or may be uploaded or may be a profile picture. Also provided at 1702 is the name of the individual, website or other contact information. Also provided is a bio 1706 which may be prepopulated by the individual associated with the photo. Also provided are direct links to social media profiles, or the like, such as LinkedIn 1707, Github 1708, social media handle 1709 such as Twitter, Instagram or the like.

Upon clicking on message 1703, email 1704, phone call 1705, LinkedIn handle 1707, Github handle 1708, or other social media handle 1709, the user is then taken to the relevant page or app within device 1000 whether that be to make a phone call or send an email or link to social media channels associated with that individual. FIG. 14 through 17 may run in two profile modes, consumer or enterprise, where enterprise may provide a premium tiered feature of the invention such that users are able to create events, which is preferably an extension of the standard event type made available consumer mode (or all users). In a preferred embodiment, all users (enterprise or otherwise) who arrive at an event will be prompted to add more detail to their profile, populating their contact card (if not done so already). User thumbnails appearing in the context of a business event (in comments and in the events) may direct a user to their contact card when pressed. The contact card may take any form, but may for example, refer to the current public display of a user's profile information associated with the system and method of the present invention. This may also display the users events they have created, photos they have taken, their username and their profile picture. Advantageously, the system and method of the present invention provides image (face) recognition functionality that maps users to pictures of the corresponding user in event image feeds. This allows users to "tap" on the face of a user in an event photo and "chat" or communicate with them directly. The communication may also include the ability to view the users contact card. It will be appreciated that, as part of the contact card, users have the ability to save contacts they find in a directory of users that can be accessed at a later time.

It will be appreciated that when setting up a profile that a user has the option to sign in via single sign on (SSO), whether that be via Microsoft, Google, by email or the like. Advantageously this allows synchronisation of profile data from via active directory. As will be appreciated, third party authentication APIs may be used to authenticate users (aka-SSO-Single Sign On) and ingest their existing account information and configuration (aka active directory data) for use in the present invention. Advantageously, SSO also allows the user to have the ability to disconnect and re-connect, for example, if they change employers or they have a change in circumstance. The further advantage of logging via SSO is that available data may be pulled via API's to fill in most of the fields that are required. Such as providing a profile image, biography and the like.

Figure 18:
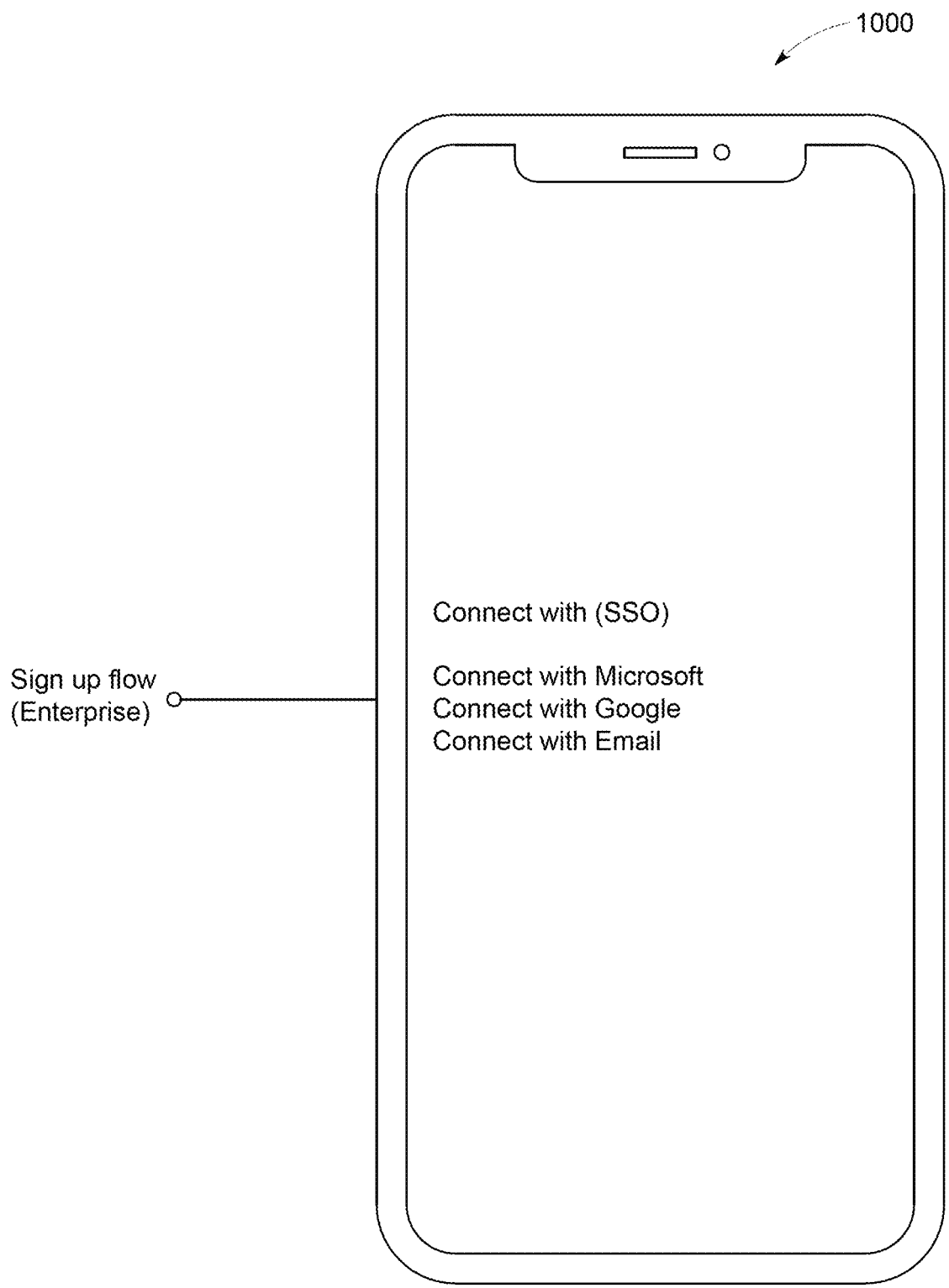
FIG. 18 is a schematic view of a user device and interface in which a sign-up flow is shown.

Referring to FIG. 18, a device 1000 in which a sign-up flow is shown for an enterprise version in which the user who is providing their profile information for connection with other users connects via signal sign on (SSO) whereby that may be carried out through any known single sign-on such as via Microsoft, Google or connecting via email or the like.

Figure 19:
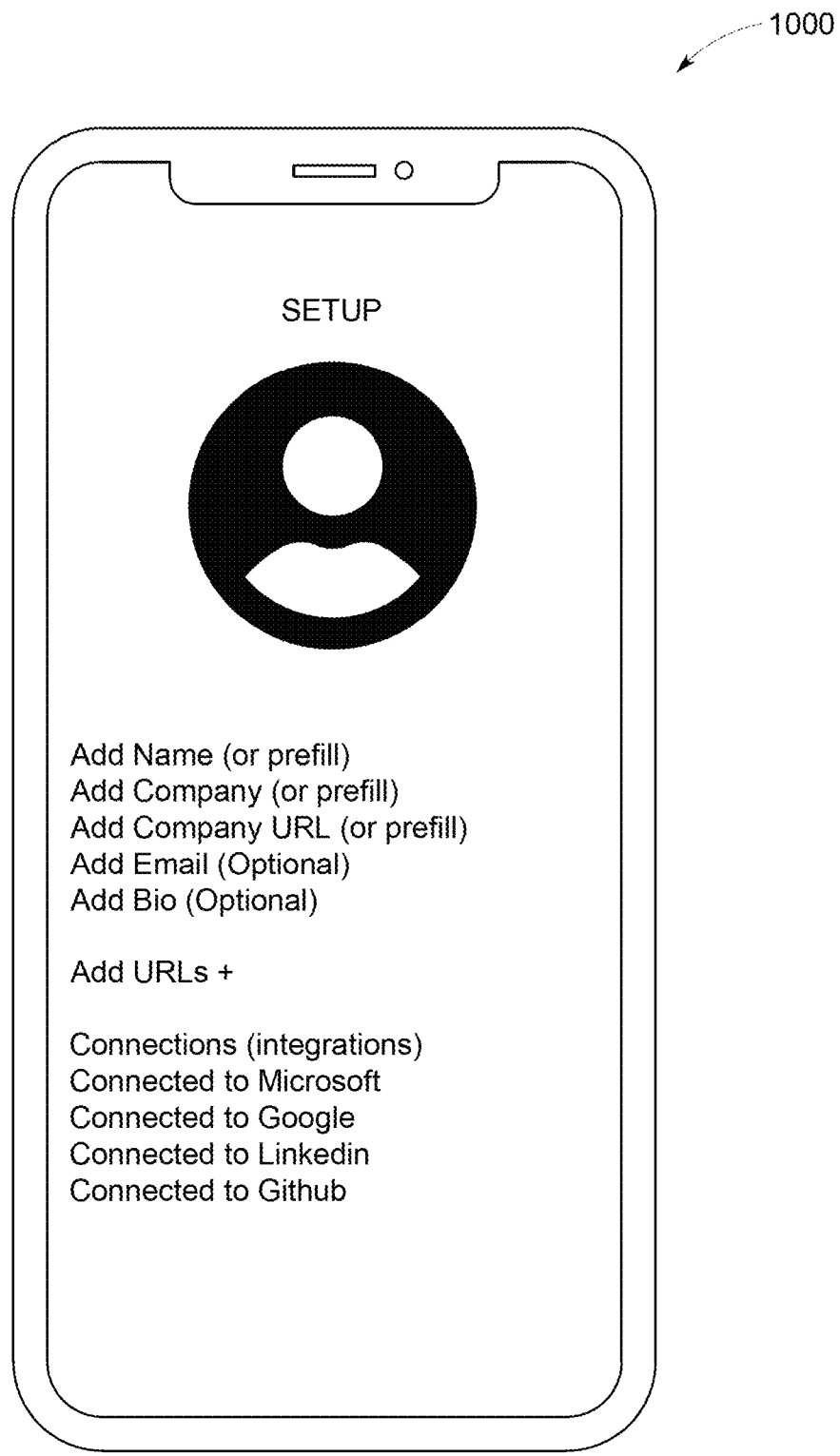
FIG. 19 is a schematic view of a user device and interface in which a user sets up a contact card.

Referring to FIG. 19, a device 1000 in which a user in an enterprise version of the system and method of the present invention sets up their contact card. The user may at this point provide a photo which may be uploaded or may be taken by themselves via the device and details may be provided either via pre-fill (which would be associated with SSO) for example. The user may manually add their data and that includes their name, company, URL for their company, email address, biography and adding URLs/links to their various social media channels or connections such as LinkedIn, Google, Microsoft, Github, Instagram, or the like.

Figure 20:
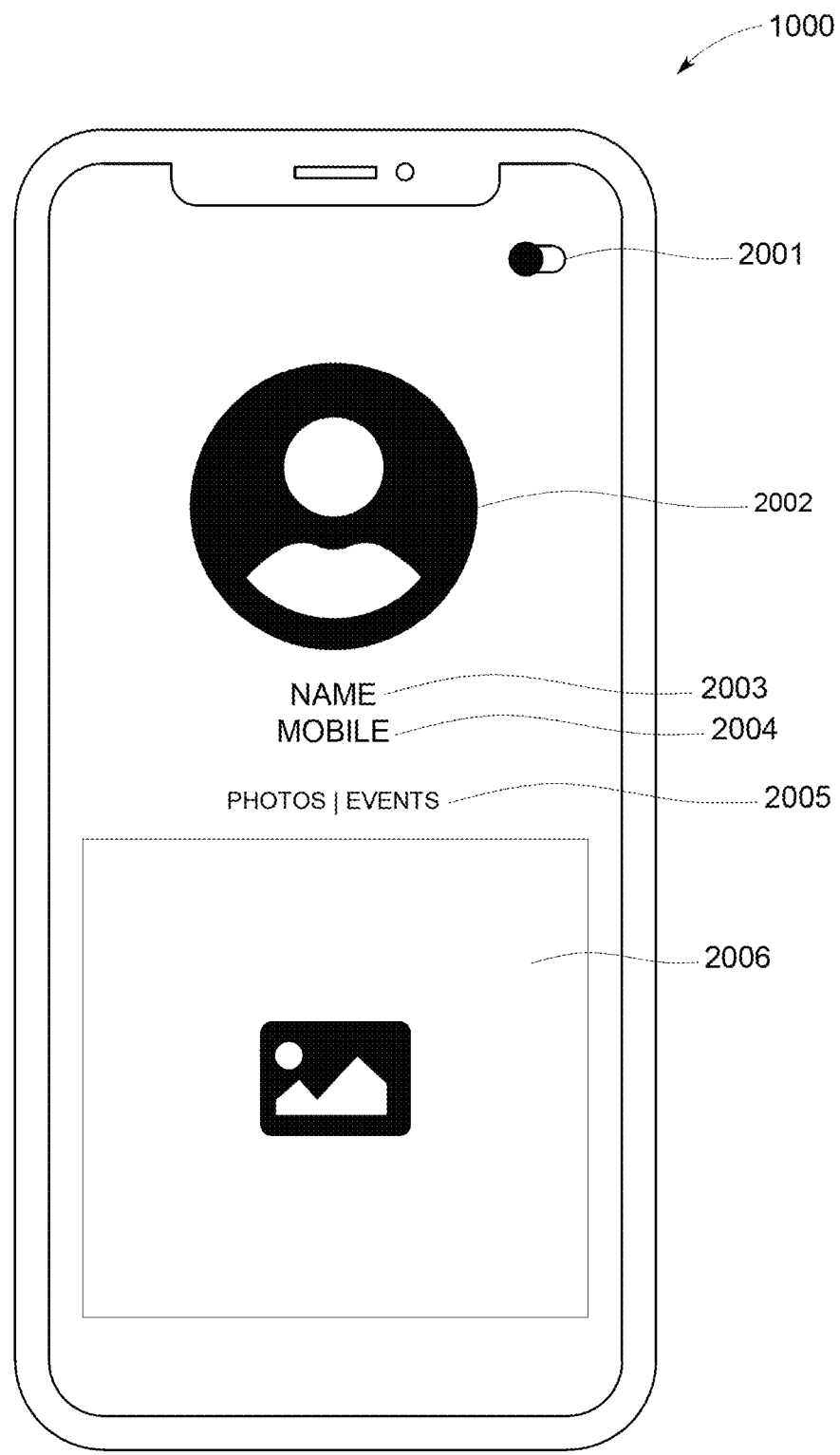
FIG. 20 is a schematic view of a user device and interface showing how the user may switch between a consumer and enterprise version of the system and method of the present invention.

Referring to FIG. 20, there is shown a device 1000 in which the user may switch between a consumer and enterprise version of the system and method of the present invention by way of a toggle 2001 or any suitable means. FIG. 20 shows the user's contact card in in consumer mode and a user can view their contact card or may view their contact card via enterprise mode via a navigation button via the contact card while in consumer mode instead of a toggle. In the consumer mode there is provided an ability to have a picture of the individual 2002 which may be uploaded from a file or may be taken by the device 1000, their name 2003, their mobile phone number 2004, the ability to toggle between photos and events 2005, and photos that have been taken of them 2006. The photos 2006 may represent one or more of photos a user has taken, events the user has created, photos a user has taken and photos the user is determined to be in, as well as events the user has created and events the user has attended.

Advantageously the contact card displays the user's profile image, name, biography, company, URL associated with the company and any number of platform links which may include social media or the like. Communication with the user is possible by a direct message, email and voice and/or video communication.

It will be appreciated that the user can add their platform handles (for example, social media handle and the like) with the system and method of the present invention handling any integration permissions. Advantageously, the system and method of the present invention provides photo aggregation and facial recognition within those photos to display professional details of the individual identified in the photo and allow communication between individuals subject to permissions. In an embodiment, detailed permissions relating to the contact card may be set by the user, so that the user can elect to have their contact card shown when other users click on their face from photos of business events they have attended, view another user's contact card when a user taps or clicks on a photo of a user's face within a business event, allow viewing of a user's contact card when a user press on a thumbnail picture of the user in the context of a business event, allow viewing of a user's contact card when selected them from a directory, or set permissions around relevant profile information associated with the contact card, e.g. limiting or providing access to FIRST NAME, LAST NAME, OCCUPATION, BIO, LINKS, PROFILE PICTURE.

While business cards and the like can be used in identifying and connecting with individuals and networking, these are tending to fall out of favour and serendipitous meetings at networking events are often difficult unless the connections are sought out which is often not possible. The present invention advantageously solves this problem by providing a digital layout in the form of a contact card and provides a convenient and intuitive way to identify individuals through event photos and then by tapping on the faces of the individuals within the photos at the event to display professional details and provide ways to communicate with those individuals who isn't at the event (it is again subject to admissions). Advantageously, a user may set up a meeting with another user via their contact card while at an event, or while viewing a photo from an event-subject to permissions, so that they can arrange a time in the near future to meet for professional purposes. Advantageously, a user may initiate a chat communication with another user via their contact card while at an event, or while viewing a photo from a business event without the need do physical networking at the event. Equally, a user may disable the ability to be being contacted at an event or only be contactable after the event—or vice versa.

As shown in FIGS. 14 to 17 overlay of professional details allows each individual to provide the details they would like to be made available to others for networking. It allows users to access and view professional details of individuals in real time at an event (or for example, later in the evening after the event has finished and they are looking at photos) and avoids the need for additional searching or research to connect with that individual. Advantageously users of the system may establish their own contact card such that they have the ability to pull professional details from, for example, their LinkedIn profile which may be summarised by a Large Language Model LLM (e.g. chatGPT or the like) which creates a succinct bio with minimum friction. The user can also add their personal links to the contact card which are inclusive of user handles and personal URLs.

In an embodiment, a brief questionnaire may be provided to the user as a prompt. This prompt containing some nominal input from the user for provides input to an LLM to produce a small paragraph of text for the user to be used as their bio. The user may be asked two to three relevant questions (in addition to their name and job title for example). The generated text can be regenerated any number of times, is fully editable by the user and must be confirmed before it is applied to their profile. In an alternative embodiment an automatic approach may be taken, where information may be scraped from LinkedIn or the like via active directory data to obtain the nominal data needed to use an LLM to generate the bio of the user.

The contact card also provides the ability to communicate with individuals through direct messaging, email or phone call which allows the user to establish communication and connections. This may occur through the system and method of the invention directly or via a third party API or app such as Gmail, MS Teams, Outlook or the like.

In an embodiment, the contact card may include also include payment information such that a user can tip and/or donate to a service provider at an event. More broadly users can also transfer money more generally between users by integrated payment gateways.

A user may have one or more payment accounts (e.g., card accounts) issued by an issuer, such as an issuing bank. The contact card may include payment selection data. The payment selection data may include data suitable for the selection of a payment account associated with the user for use in funding a financial transaction (associated with an event or otherwise). In an embodiment, the payment selection data may not include any personally identifiable information or information that may compromise the associated payment accounts, such as payment account numbers. For example, the payment selection data may include the last four digits of the associated payment account number and a nickname associated with the payment account.

The user may initiate a financial transaction with a merchant associated with an event for the purchase of products (e.g., goods and/or services) or to make a donation, or to provide a tip. It should be noted that as used herein the merchant can be a person in a person-to-person (P2P) payment transaction and virtually any other entity that wishes to receive payments with the involvement of a mobile device of a user. In some embodiments, the user may initiate an in-person financial transaction, such as conducted at a physical location of the merchant via a point-of-sale terminal. In other embodiments, the user may initiate the financial transaction via a network, such as the Internet. In some instances, the Internet transaction may be conducted with the mobile device via a mobile network operator (e.g., a wireless service provider). In other instances, the Internet transaction may be conducted with a separate device, such as a computing device (e.g., a smart watch, laptop computer, notebook computer, etc.).

In an embodiment, the contact card may include also include information such that a user can book a service or venue. For example, a user may be guided through a booking from a contact card. That is to say, the user may first be presented with an interface requesting that temporal information for the booking or reservation be provided. After the user transmits the requested temporal data to the server, the server may respond by presenting the user with a page requesting that location information for the reservation be provided, which may be prepopulated based on the current location. After the user transmits the requested location data to the server, the server may respond by presenting the user with a page requesting payment or other information be provided, and so on until the server receives all types of necessary data. Once all types of necessary data are received, the server typically presents the user with a verify page that summarizes the entered data.

In an embodiment, the contact card may be accessible via a bot, by an API or webhook as a way of altering the behavior of the contact card with custom callbacks. These callbacks may be maintained, modified, and managed by third-party users and developers who may not necessarily be affiliated with the originating contact card.

Webhooks are "user-defined HTTP callbacks", for example, an HTTP POST that occurs when something happens, e.g., a simple event-notification via HTTP post. They are usually triggered by some event, such as pushing code to a repository or updating a database, for example and event database. When the relevant event occurs, the source site makes an HTTP request to the URI configured for the webhook. Users can configure them to cause events on one site to invoke behavior on the contact card. The action taken may be anything, including actions relating to the embodiments described above.

In one example, webhooks can be used for receiving data in real time, for example, data relating to users, an event, location specific news, or the like. Advantageously, webhooks eliminate the need for polling every couple of minutes to find out if there is new information. A webhook may just be registered and data may be received as soon as it is available.

As described above, an API managed by an API manager may also be provided to update the contact card. An API allows an application programmer to efficiently develop an application capable of interfacing with the contact card because the interface work is already done by the API. For example, the programmer can incorporate or program the needed API functions from the API library into the application program. The API may be provided as part of a software development kit (SDK) or other tool to develop application programs, as will be described below. The SDK may include APIs or may enable the developer to remotely access APIs for the contact card.

The API manager may also request API keys be provisioned for the contact card and process API calls from the contact card. The API manager may also be provided a portal for developers to view API keys and their conditions (e.g., permissions, restrictions, etc.), request reports on API usage, and request new API keys be generated if the existing ones are compromised. Similarly, the API manager may provide a portal for third-party service providers to provide upgrade notifications and request reports on the API keys etc.

In an embodiment, the contact card may be configured to run applications (or apps) via the API or otherwise. For example, a user may elect to run a chat bot that speaks for them in place of the contact card; allow their own products and services to be run within the contact card; and, create a game that runs instead of the contact card.

As described above, apps may be designed as part of a "platform" that provide app developers with access (e.g., via a published API) to their services (e.g., a cloud service) and to user content, such platforms typically are designed to enable app developers to enhance the core capabilities of the contact card, rather than to repurpose user content to a particular content domain.

The apps may be monetized by third-party developers within a platform marketplace in the content card. In a number of embodiments, the invention provides an ecosystem that streamlines the app development process, enhances marketplace functionality, and ensures a secure and efficient environment for developers and end-users.

The system may comprise a Developer Portal, a central hub accessible to registered developers, offering comprehensive documentation, SDKs, and APIs facilitating seamless app creation to work in the contact card. The platform also provides a robust testing environment allowing developers to simulate platform behaviour, debug, and test applications without affecting the live system and those skilled in the art will recognise suitable methodologies for providing those stated functions.

A submission and approval process ensures that developed applications meet predefined standards, security protocols, and compliance requirements before being published in the platform's marketplace. This approval process safeguards the quality and security of applications available to end-users.

Developers may also be offered a range of monetization models within the contact card marketplace, including one-time purchases, subscriptions, in-app purchases, and freemium models. The platform supports flexible pricing strategies and revenue-sharing mechanisms between developers and the platform.

An intuitive user interface may also be provided within the marketplace that allows developers to publish their applications with detailed descriptions, images, pricing, and metadata, enhancing visibility and accessibility to end-users. Users can rate and review applications, contributing to an informed decision-making process and fostering a collaborative community.

Furthermore, the platform incorporates robust analytics tools, providing developers with insights into app performance, user engagement, and other key metrics. This facilitates continuous improvement and refinement of applications over time.

The disclosed system and method offer a comprehensive and user-friendly ecosystem for third-party app development and sales within a platform marketplace, empowering developers while ensuring quality, security, and an enhanced experience for end-users.

For example, social networks are designed to facilitate the creation of user communities and the selective sharing of personal information among those communities. In a similar way, apps developed on the present platform may leverage a core "sharing" functionality by providing shared access to external content (e.g., from other websites) and activities (e.g., games, commerce, a marketplace etc.).

Using the above marketplace example, a developer may develop an application via an API that allows users to sell a product that they make from their contact card whenever a customer taps on their face in any photo. Sell items that appear in a specific photo within the contact card such as the shoes a user is wearing or the car in the background. The market place may be open or private.

In an embodiment, the contact card provides a comprehensive ecosystem that enables content creators to record, stream and publish audio content and broadcast in real-time, fostering a dynamic and immersive audio experience for the audience.

The system comprises a multi-functional platform that facilitates the creation and broadcasting of audio content. Content creators utilise contact card to record, edit, and stream live or pre-recorded audio content. Those skilled in the art will recognise suitable streaming formats for providing the stated functionality.

In one or more embodiments, the contact card provides audience interaction and engagement tools. Listeners can interact with the audio content in real-time through features such as live chat, comments, polls, and Q&A sessions. These engagement tools foster a vibrant community and enable creators to interact directly with their audience, creating an immersive and participative experience.

Additionally, the system incorporates analytics tools that offer insights into audience behaviour, engagement patterns, and content performance. These analytics aid creators in understanding their audience preferences, optimizing content strategies, and enhancing user engagement over time.

In an embodiment, there may be provided a feature for photographs which are taken in a "selfie" arrangement whereby individuals who are photographed together are prompted to collect each others contact cards via a visual indicator which is layered upon once it has been taken. From this point, the users, if they so decide, can see the contact card and initiate communication through direct messaging, email or phone, or the like. Permissions may dictate what is available to individuals who are both in the photo together and has set up contact card with the system and method of the present invention. In operation, this feature facilitates the swapping of contact information by way of gamification of networking via a "selfie" photograph with at least one, but preferably more than one participants. For example, if two users are detected in a single photo the server sends a real time notification to both users' devices/applications asking if they would like to share their contact details. If the response is affirmative, the end user will save the other users contact details in their user directory. In the present invention the facial recognition technology and hash trigger a data transfer event.

In terms of identifying faces within photographs, the system adds the picture of someone's face from a photo to a pool of faces on a server (which may be for example, an AWS platform) and then creates a unique hash for each face. When the photo is uploaded to the server, the photo is analysed for faces and adds those faces to the pool of faces. The location (x, y, w, h) of the face are stored in a database associated with the server of the system and method of the present invention.

When the system and method of the present invention makes a face connection between a profile and a photograph, it stores the connection in a database and relates this data to the uploaded image. Then, when the photo is displayed on the mobile device 1000 the faces within the image become click/tappable based on the related data set and when a profile connection has been made. Only once the system has correctly identified an individual, does their face become "tappable". The server needs to receive the profile image, acknowledges its a face, add the users face data to a library of known faces to watch for. Then, whenever a new image comes into the database, it is scanned for faces that exist in an existing library of faces. If the user's face isn't in the library, it will be ignored.

When a face in an image is tapped the system and method of the present invention displays the professional details of that individual (if they have been set up) and there is then the ability to communicate via direct message, email, video or phone fall. It will also be appreciated that any communication that is classified as a connection is saved in a database by the server and related back to the user profiles.

INDUSTRIAL APPLICABILITY

The image archiving of the invention is used in the communication and publishing of images which are employed in social information systems. The present invention is therefore industrially applicable.
Interpretation
It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected. For example, the particular elements of the image archiving may vary dependent on the particular application for which it is used without variation in the spirit and scope of the present invention.

In addition, although the preferred embodiments described herein are directed to image and message archiving for use in an event recording system, it will be appreciated by those skilled in the art that variations and modifications are possible within the scope of the appended claims.

It would be appreciated that, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment.

Thus, one embodiment of each of the methods described herein is in the form of a computer-readable carrier medium carrying a set of instructions, e.g., a computer program that are for execution on one or more processors.

Unless specifically stated otherwise, as apparent from the following discussions, it is appreciated that throughout the specification discussions utilizing terms such as "processing", "computing", "calculating", "determining" or the like, can refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken is included.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Similarly, it is to be noticed that the term "coupled", when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may refer to the same embodiment. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description. Although the invention has been described with reference to specific examples, it will be appreciated by those skilled in the art that the invention may be embodied in many other forms.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

The claims defining the invention are as follows:

1. A method of regulating event attendance and initiation of communication between one or more users, the method including:

a first host user creating at a remote service a repository relating to an event at a specified location;

one or more guest users located at the event at the specified location and having been provided with permission to do so, asynchronously storing in the repository information relating to the event, the information including at least one image; and wherein the at least one image stored to the repository wherein the images stored to the repository are subjected to analysis by the remote service to determine whether persons appearing in the image are identifiable as persons known and approved by the first host user or a delegate;

persons known and approved by the first host user or delegate and appearing in images to a guest user being linked in the image to an identifier, the identifier allowing initiation of communication from the guest user to the identified person in the image.

2. The method of claim 1, wherein the analysis by the remote service includes extracting a facial hash from an image for use as an identifier.

3. The method of claim 1, wherein initiation of communication includes interacting with the image or one or more faces within the image.

4. The method of claim 3, wherein interacting with the image includes tapping, double-tapping, clicking, press-and-hold or swiping on the image or the one or more faces within the image.

5. The method of claim 3, wherein the method further includes the step of displaying a contact card, the contact card containing biographical details associated with a user in the image, in response to interacting with the image or one or more faces within the image.

6. The method of claim 3, wherein the method further includes the step of providing a communication channel in response to interacting with the image or one or more faces within the image.

7. The method of claim 6, wherein the communication channel includes, one or more of a message application, video call or instant messaging service.

8. The method of claim 1, wherein the at least one image is an image of one or more users; and wherein persons determined to be known and approved by the first host user or a delegate and appearing in the image are linked in the image to an identifier, the identifier allowing initiation of communication from two or more users identified in the image.

9. The method of claim 8, wherein the image is captured by a mobile communication device associated with one or more of the users.

10. The method of claim 1, wherein an at least one image stored in the repository being optionally made available for download from the remote service to one or more persons upon the approval of the first host user or a delegate of the first host user.

11. The method of claim 1, wherein the one or more persons to whom the at least one image is optionally made available for download is a guest user.

12. The method of claim 1, wherein a guest user is provided with permission to asynchronously store information in the repository using the remote service by the host user or a delegate of the first host user.

13. The method of claim 1, wherein images stored in the repository are separately authorised by the first host user to be separately viewable by one or more guest users.

14. The method of claim 1, wherein images stored in the repository may be separately authorised by the first host user to be viewable by any user.

15. The method of claim 1, wherein the one or more guest users are granted permission by the providing of a passcode to the user by the first host user.

16. A system for regulating event attendance and initiation of communication between one or more users, the system including:
- an application for download to a device from a remote source;
- a first host user mobile device after downloading and installing the application thereto having a repository creator process to create at a remote service a repository relating to an event at a specified location or at the location of the first host user;
- one or more guest user mobile devices capable of being located at the event location, the one or more guest user mobile devices after downloading and installing the application thereto to asynchronously store information relating to the event and including images to the repository relating to the event after being identified and being granted permission to do so; the information including at least one image; and wherein the at least one image stored to the repository are subjected to analysis by the remote service to determine whether persons appearing in the image are identifiable as persons known and approved by the first host user or a delegate;
- the stored information in the repository being wholly or separately authorised by said first host user mobile device to be available for viewing by at least selected guest user mobile devices; and persons known and approved by the first host user or delegate and appearing in images to a guest user being linked in the image to an identifier, the identifier allowing initiation of communication from the guest user to the identified person in the image.

\* \* \* \* \*